United States Patent
Segal et al.

(10) Patent No.: US 12,080,140 B1
(45) Date of Patent: Sep. 3, 2024

(54) EVENT-DETECTION CONFIRMATION BY VOICE USER INTERFACE

(71) Applicant: Amazon Technologies, Inc., Seattle, WA (US)

(72) Inventors: Mara Clair Segal, Palo Alto, CA (US); Robert Waverly Zehner, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 21 days.

(21) Appl. No.: 17/492,086

(22) Filed: Oct. 1, 2021

Related U.S. Application Data

(63) Continuation of application No. 16/455,149, filed on Jun. 27, 2019, now Pat. No. 11,138,858.

(51) Int. Cl.
| | |
|---|---|
| G08B 21/04 | (2006.01) |
| G10L 13/027 | (2013.01) |
| G10L 15/22 | (2006.01) |

(52) U.S. Cl.
CPC ..... G08B 21/0469 (2013.01); G08B 21/0476 (2013.01); G10L 13/027 (2013.01); G10L 15/22 (2013.01); G10L 2015/223 (2013.01); G10L 2015/225 (2013.01)

(58) Field of Classification Search
CPC ............ G08B 21/0469; G08B 21/0476; G10L 13/027; G10L 15/22; G10L 2015/223; G10L 2015/225
See application file for complete search history.

(56) References Cited

U.S. PATENT DOCUMENTS

| | | | |
|---|---|---|---|
| 4,724,524 | A | 2/1988 | Thomas et al. |
| 5,414,409 | A | 5/1995 | Voosen et al. |
| 8,217,795 | B2 * | 7/2012 | Carlton-Foss ....... A61B 5/0024 |
| | | | 340/4.1 |
| 9,227,484 | B1 | 1/2016 | Justice et al. |
| 9,703,864 | B2 | 7/2017 | Pratt et al. |
| 9,811,818 | B1 * | 11/2017 | Xing ................. G06Q 20/3821 |
| 9,911,290 | B1 | 3/2018 | Zalewski et al. |
| 9,913,099 | B2 | 3/2018 | Watkins et al. |
| 9,965,685 | B2 | 5/2018 | Matsuoka et al. |

(Continued)

OTHER PUBLICATIONS

Office Action for U.S. Appl. No. 16/455,149, mailed on Feb. 18, 2021, Segal, "Event-Detection Confirmation by Voice User Interface", 29 Pages.

(Continued)

*Primary Examiner* — Nay Tun
(74) *Attorney, Agent, or Firm* — Lee & Hayes, P.C.

(57) ABSTRACT

Systems and methods for event-detection confirmation are disclosed. For example, a sensing device may generate sensor data, such as from radar, and the sensor data may be utilized to determine if a predefined event as occurred. Event-confirmation operations may then be performed, such as by utilizing acoustic-event detection techniques and/or natural language understanding techniques. When occurrence of an event is confirmed, such as to a certain confidence level, one or more actions may be taken, such as sending a notification to another device and/or establishing a communication channel with another device, such as a device associated with emergency services, family members, friends, and/or neighbors.

20 Claims, 11 Drawing Sheets

(56) References Cited

U.S. PATENT DOCUMENTS

| | | |
|---|---|---|
| 9,996,819 B1 | 6/2018 | Modi |
| 11,170,295 B1* | 11/2021 | Carmichael .......... G06N 3/0454 |
| 2012/0029665 A1 | 2/2012 | Perry |
| 2013/0278422 A1 | 10/2013 | Friedman |
| 2013/0331055 A1 | 12/2013 | McKown et al. |
| 2014/0320280 A1 | 10/2014 | Sager et al. |
| 2014/0320312 A1 | 10/2014 | Sager et al. |
| 2015/0221321 A1 | 8/2015 | Christian |
| 2015/0317801 A1 | 11/2015 | Bentley et al. |
| 2015/0348591 A1 | 12/2015 | Kaps et al. |
| 2016/0125882 A1 | 5/2016 | Contolini et al. |
| 2016/0277863 A1 | 9/2016 | Cahill et al. |
| 2016/0322078 A1 | 11/2016 | Bose et al. |
| 2016/0323508 A1 | 11/2016 | Ayalasomayajula et al. |
| 2016/0353266 A1* | 12/2016 | Winkler ............... G08B 25/016 |
| 2016/0364963 A1 | 12/2016 | Matsuoka et al. |
| 2017/0026763 A1 | 1/2017 | Pratt et al. |
| 2017/0109990 A1* | 4/2017 | Xu ..................... G08B 21/0446 |
| 2017/0161720 A1* | 6/2017 | Xing .................. A61B 10/0051 |
| 2017/0164158 A1 | 6/2017 | Watkins et al. |
| 2017/0186441 A1 | 6/2017 | Wenus et al. |
| 2017/0196196 A1 | 7/2017 | Trottier et al. |
| 2017/0215208 A1* | 7/2017 | Burnham ............... G16H 10/60 |
| 2018/0066944 A1 | 3/2018 | Shu et al. |
| 2018/0196919 A1 | 7/2018 | Abou Mahmoud et al. |
| 2018/0292523 A1 | 10/2018 | Orenstein et al. |
| 2018/0310159 A1 | 10/2018 | Katz et al. |
| 2018/0357870 A1 | 12/2018 | Siminoff et al. |
| 2019/0043500 A1 | 2/2019 | Malik et al. |
| 2019/0051144 A1* | 2/2019 | David ................ G08B 21/0415 |
| 2019/0105450 A1 | 4/2019 | Sutherland et al. |
| 2019/0197861 A1* | 6/2019 | Tunnell ................ G08B 21/043 |
| 2019/0231280 A1* | 8/2019 | Tudor .................. A61B 5/7455 |
| 2020/0066126 A1 | 2/2020 | Voor |
| 2020/0329358 A1 | 10/2020 | Hamre et al. |

OTHER PUBLICATIONS

Office Action for U.S. Appl. No. 16/455,149, mailed on Aug. 21, 2020, Segal, "Event-Detection Confirmation by Voice User Interface", 27 pages.

Walabot, "Protect lives with Walabot HOME", retrieved on Jun. 27, 2019 at <<https://walabot.com/walabot-home/about-us.>>, 16 pages.

* cited by examiner

600

Receive, from first device having radar functionality, first data indicating that physical event has been detected utilizing radar functionality
602

Receive, from second device that includes microphone and speaker, second data that confirms physical event has occurred, second data indicating that acoustic-event detection component of second device has determined that audio fingerprint of first audio data corresponds to reference audio fingerprint indicating sound designated as confirming occurrence of physical event
604

Receive, from second device, second audio data representing response to request to provide audible confirmation of physical event occurring
606

Determine, utilizing natural language understanding processing, that response indicates confirmation of physical event occurring
608

Cause, from at least one of second data or determining that response indicates confirmation of physical event occurring, communication channel to be established between second device and third device
610

FIG. 6

EVENT-DETECTION CONFIRMATION BY VOICE USER INTERFACE

RELATED APPLICATIONS

This application claims priority to and is a continuation of U.S. patent application Ser. No. 16/455,149, filed on Jun. 27, 2019, the entire contents of which are incorporated herein by reference.

BACKGROUND

Electronic devices can now be used to assist in user tasks and/or for communication purposes. Electronic devices designed to assist users in times of need can be life-saving and/or can be useful to caregivers. Described herein are improvements in technology and solutions to technical problems that can be used to, among other things, assist users in times of need and/or at other times.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example process for event-detection confirmation.

DETAILED DESCRIPTION

Figure 1:
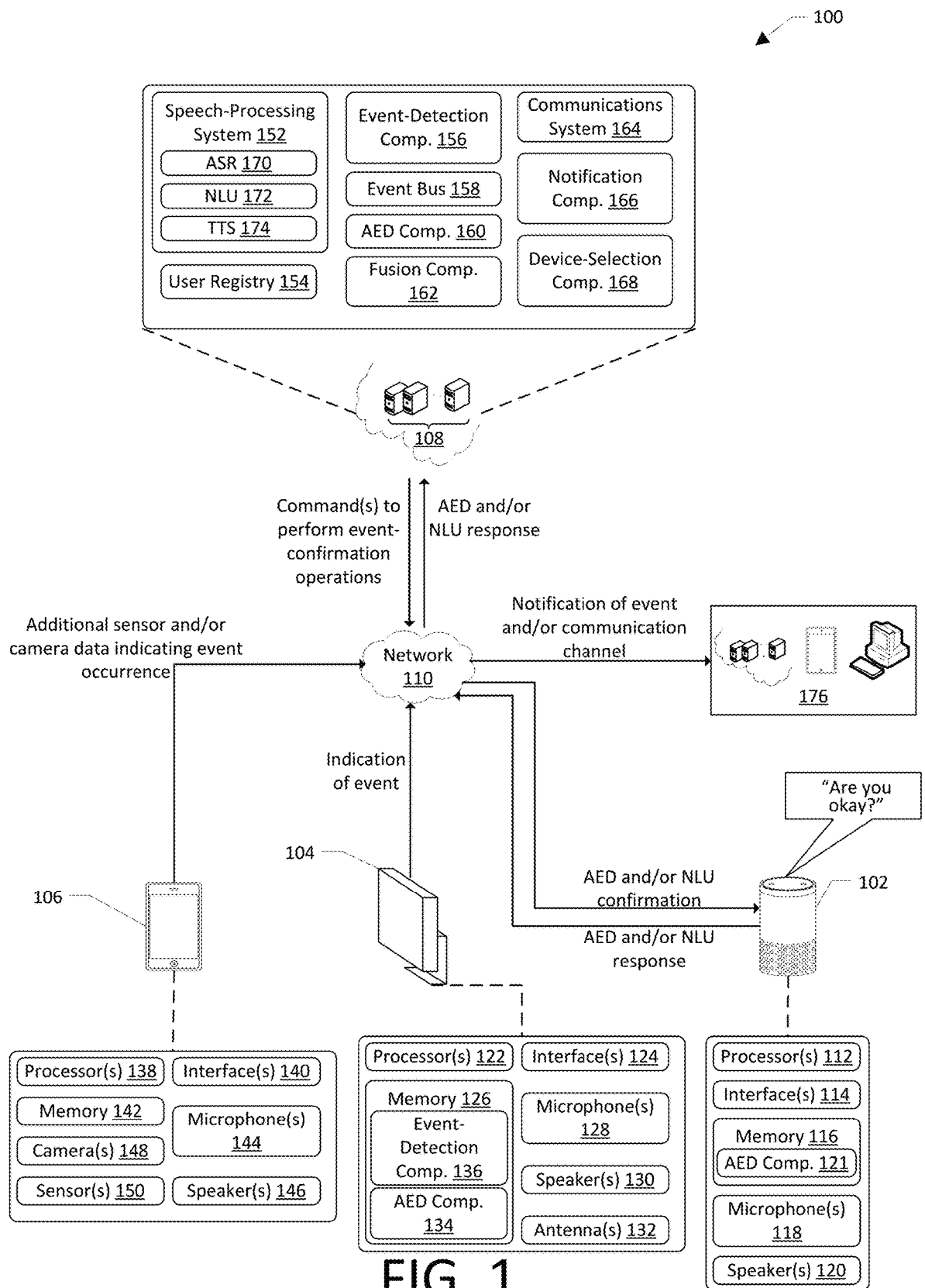
FIG. 1 illustrates a schematic diagram of an example environment for event-detection confirmation systems.

Systems and methods for event-detection confirmation are disclosed. Take, for example, an environment such as a home where one or more users reside. Such users may make intentional and unintentional noise while residing in the environment. Such intentional noises may include talking, footsteps, operation of applications, contacting two or more objects together, etc. Example unintentional noises may include falling and/or noises may when a user is in need of assistance, such as medical assistance. Such users may desire to have a system included in the environment that can detect when certain unwanted or otherwise predefined events occur and take corrective actions. Such users may also desire the system to not take such corrective actions when intentional noises are being made and/or when the predefined event is not occurring.

The present innovation provides for a system that may be utilized to confirm when a predefined event, also described herein as a physical event, occurs and to take corrective actions. For example, an environment may include a sensing device and/or one or more voice-enabled devices. The sensing device may include sensors configured to receive electromagnetic waves at various bandwidths and/or bandwidth ranges. For example, a given sensing device may include an ultra-wide band antenna configured to receive electromagnetic waves with a bandwidth at or around 6 GHz. The sensing device may also include a millimeter-wave band antenna configured to receive electromagnetic waves with a bandwidth at or around 60 GHz. This dual-band radar functionality may be utilized to detect sound that is likely to correspond to a predefined event, such as a person falling. By utilizing dual-band radar functionality as described herein, the radar may be able to detect event occurrences in rooms or other types of spaces in both the room in which the sensing device is located and other, such as adjacent, rooms. For example, the electromagnetic waves may be received at the antennas and corresponding sensor data may be generated. The sensor data may be utilized by the sensing device to determine if one or more predefined events have occurred. Event data indicating that the sensing device has determined that a predefined event has occurred may be sent from the sensing device to a remote system for event-detection confirmation processing. In other examples, the sensor data may be sent from the sensing device to another device and/or system, such as a remote system configured to process the sensor data, to determine whether the one or more predefined events has occurred. In examples, detection of an event and/or generation of sensor data may be based at least in part on a state of the sensing device. For example, the sensing device and/or an associated device in the environment may be in a "home" or an "away" state. These states may indicate what types of events may be detected. For example, when the device is in an "away" state, detection of the presence of a moving object may be an event to be determined. When the device is in a "home" state, presence detection may not be an event of interest, but instead the events of interest may be a fall, for example. The state of the device may also be utilized to determine when radar functionality is enabled. The state of the device may also be utilized to determine what type of action is to be performed when an event is confirmed to have occurred, as described elsewhere herein.

The remote system, having received, determined, and/or generated the event data indicating that the predefined event has occurred may determine that one or more confirmatory operations are to be performed. For example, the event data may be associated with a confidence value indicating a confidence at which the predefined event was determined to have occurred. In examples where the confidence value satisfies a threshold confidence that the predefined event occurred, the remote system may determine that the confirmatory operations are to be performed. In other examples where the confidence value fails to satisfy the threshold confidence that the predefined event occurred, the remote system may not perform confirmatory operations.

A device-selection component of the remote system may be utilized to determine which device associated with the environment should be utilized for event-confirmation operations. To select a device, the device-selection component may identify and/or determine a device identifier associated with the sensing device. The device-selection component may utilize the device identifier to determine a user account associated with the device identifier. The user account may be an account stored in association with a user registry of the remote system, and the user account may indicate device identifiers of other devices associated with the user account. The user account may also include information indicating a location of one or more of the other devices with respect to the environment and/or the functionality of some or all of those devices. In examples, the information may include an indication of a distance between a given device and the sensing device, a room designation associated with a given device, and whether a given device includes a microphone and/or a speaker. The device-selection component may utilize this information and, in examples, data indicating a location of the predefined event, to determine which device to utilize for event-confirmation operations. In examples, the sensing device may be selected for event-confirmation operations. In other examples, the sensing device may not include components and/or functionality for performing one or more of the event-confirmation operations and/or another device may be closer to the location of the predefined event and may be selected for performing the event-confirmation operations. In still other examples, multiple devices may be selected and/or utilized to perform the event-confirmation operations and/or portions thereof.

The confirmatory operations may include, in examples, sending data to the selected device. The data may represent instructions and/or commands for the selected device to perform one or more operations. Those operations may include, in examples, causing a microphone of the selected device to capture audio from the environment and acoustic-event detection (AED) analysis may be performed by the selected device in addition to and/or instead of by a remote system. In other examples, the audio data may be sent to the remote system for AED analysis. In other examples, the microphone of the selected device may already be configured to capture audio, and in these examples, the operations may include causing the selected device to send the generated audio data to the remote system for AED analysis. In still other examples, In these examples, the operations may include causing AED functionality to be enabled or otherwise turned on, or the operations may include causing AED functionality to transition from a first mode to a second mode representing a higher sensitivity to audio data generated by the microphone. An AED component of the selected device and/or the remote system may utilize the audio data generated by the microphone of the selected device to determine if an audio fingerprint of the audio data, or portion thereof, corresponds to a reference audio fingerprint associated with the predefined event. For example, the one or more predefined events may be associated with one or more reference audio fingerprints characteristic of sound made when the event occurs. For example, the sound of a human body hitting a floor in the event of a fall may have a given audio fingerprint, a person expressing pain and/or disorientation may have another audio fingerprint, glass breaking may have yet another audio fingerprint, cessation of breathing, etc. The AED component may receive an indication of the type of predefined event that has been detected and may utilize reference audio fingerprints associated with that event type for analysis in association with the audio fingerprint in question. The AED component may determine that the audio fingerprint corresponds to at least one of the reference audio fingerprints, such as to a given confidence level, and may generate confirmatory data indicating that the audio fingerprint corresponds to the at least one reference audio fingerprint. The confirmatory data may be sent to a fusion component of the remote system for further processing.

It should be understood that the activation of microphones and/or the generation of information from microphones is performed only in instances where the user has provided consent for such actions to be performed.

Additionally, or alternatively, when an indication that a predefined event has occurred is received at the remote system, the remote system may perform event-confirmation operations associated with natural language understanding (NLU) techniques. For example, based at least in part on the indication of the predefined event occurring and/or the type of event, the remote system may generate audio data representing a request for audible confirmation that the predefined event has occurred. For example, the request may be "A fall has been detected. Are you okay?" A text-to-speech component of the remote system may be utilized to generate the audio data, in examples. The audio data may be sent from the remote system to the selected device, which may cause the selected device to output audio representing the request via a speaker of the selected device. The user and/or another user in the environment may provide an audible response to the request. The response may confirm or refute that the predefined event occurred. For example, when the request includes "Are you okay?" a response of "no" may indicate that the predefined event occurred while a response of "yes" may indicate that the predefined event did not occur. The microphone of the selected device may receive audio representing the response and may generate corresponding audio data. The audio data may be sent to the remote system for speech processing, which may include generating, utilizing automatic speech recognition techniques, text data corresponding to the audio data and then utilizing the text data to determine, utilizing NLU techniques, intent data representing the response. The intent data and/or data indicating whether the natural language understanding processes resulted in confirmation of event occurrence may be sent to the fusion component of the remote system.

The fusion component of the remote system may receive the event data and/or may receive the confirmatory data from the AED component and/or the NLU component. The fusion component may utilize some or all of this information to determine whether to confirm that the predefined event occurred, whether to perform additional event-confirmation operations, and/or whether to take one or more actions in response to the predefined event. For example, the fusion component may determine that an action is to be taken without event-confirmation operations when a confidence value associated with the event data is greater than a threshold confidence. In other examples, the fusion component may determine that confirmation operations are to be performed utilizing the AED component, as described herein. In still other examples, the fusion component may determine that confirmation operations are to be performed utilizing the NLU component, as described herein. The confirmatory data from the AED component and/or the natural language understanding component may be sent to the fusion component and may be utilized to determine if additional event-confirmation operations are to be performed. For example, when the confirmatory data from the AED component indicates that the audio fingerprint corresponds to the reference audio fingerprint at below a given confidence threshold, the remote system may determine that NLU confirmation operations should be initiated. In other examples when NLU is utilized prior to AED, when the confirmatory data indicates that no response was provided by a user in the environment and/or when the response does not indicate confirmation of the event occurring, such as above a confidence threshold, the remote system may determine that AED confirmation operations should be initiated.

The fusion component may also utilize the indication of the event and/or the confirmatory data to determine whether an action is to be performed. For example, the fusion component may confirm that the predefined event occurred and may cause one or more components of the remote system to perform an action. The action may include, for example, sending a notification of event occurrence to a designated device, such as the sensing device, the selected device, and/or another device. The action may also include causing a communication channel to be established between the selected device and another device designed for contact when the event occurs. The action may also include sending a notification and/or establishing a communication channel with an emergency service provider system. The action may also include causing an alarm to activate. Additional and/or different actions may be taken and may be selected based at least in part on the event type at issue and/or the confidence value associated with confirming that the event occurred.

Additionally, or alternatively, the remote system may receive additional inputs from the sensing device, the selected device, and/or another device and may utilize those inputs for confirming whether the predefined event occurred. For example, inputs such as accelerometer data from a personal device, such as a wearable device, associated with the user may be received and utilized to confirm whether the event occurred and/or to send notifications to. The inputs may also include image data in examples where a device located in the environment includes a camera. In these examples, computer vision techniques may be utilized to identify objects represented in the image data as well as information associated with the objects, such as posture, color, movement, etc. Additional inputs may include beacon data from a personal device associated with a user. The beacon data may indicate that the personal device is located in the environment. It should be understood that the activation of camera and/or other sensors is performed only in instances where the user has provided consent for such actions to be performed.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations. In examples, the information utilized herein may be encrypted if and when it is transferred between devices and systems. Also, the operations described herein and information identified, determined, and/or generated will be utilized only in a manner that is designed to comply with applicable local rules and regulations.

Additionally, or alternatively, the processes described herein may be utilized for presence detection and/or movement determination within an environment. For example, particularly when a user has requested or otherwise authorized presence detection, the sensing device and/or the voice-enabled device may track the movement of a user within an environment and may take requested actions based on the user's movement. The actions may include turning smart-home devices on and off as the user moves through the environment. In these examples, presence and/or movement detection may be based at least in part on receiving a voice request from the user, such as "Alexa, follow me."

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for event-detection confirmation. The system 100 may include, for example, a voice-enabled device 102, a sensing device 104, and/or a personal device 106. The voice-enabled device 102 may be configured to receive user utterances and perform operations in response to such user utterances. In these examples, the voice-enabled device 102 may be "hands free" such that interactions with the device are performed through audible requests and responses. The sensing device 104 may be configured to receive electromagnetic waves from an environment in which the sensing device 104 is situated and to determine when one or more predefined events occur within the environment. The personal device 106 may include a mobile phone, tablet, laptop, wearable device, and/or other computing device. The voice-enabled device 102, the sensing device 104, and/or the personal device 106 may be configured to send data to and/or receive data from a remote system 108, such as via a network 110. In examples, the voice-enabled device 102, the sensing device 104, and/or the personal device 106 may communicate directly with the system 108, via the network 110. Additionally, it should be understood that a given space and/or environment may include numerous voice-enabled devices 102, sensing devices 104, and/or personal devices 106. It should also be understood that when a "space" or "environment" is used herein, those terms mean an area and not necessarily a given room, building, or other structure, unless otherwise specifically described as such.

The voice-enabled device 102 may include one or more components, such as, for example, one or more processors 112, one or more network interfaces 114, memory 116, one or more microphones 118, and/or one or more speakers 120. The microphones 118 may be configured to capture audio, such as user utterances, and generate corresponding audio data. The speakers 120 may be configured to output audio, such as audio corresponding to audio data received from another device and/or the system 108. It should be understood that while several examples used herein include a voice-enabled device 102 that allows users to interact therewith via user utterances, one or more other devices, which may not include a voice interface, may be utilized instead of or in addition to voice-enabled devices 102. In these examples, the device may be configured to send and receive data over the network 110 and to communicate with other devices in the system 100. As such, in each instance where a voice-enabled device is utilized, a computing device that does not include a voice interface may also or alternatively be used. The memory 116 may include one or more components such as, for example, an acoustic-event detection (AED) component 121, which will be described in more detail below: It should be understood that when voice-enabled devices are described herein, those voice-enabled devices may include phones, computers, and/or other computing devices.

The sensing device 104 may include components such as one or more processors 122, one or more network interfaces 124, memory 126, one or more microphones 128, one or more speakers 130, and/or one or more antennas 132. The memory 126 may include one or more components such as an AED component 134 and/or an event-detection component 136. The microphones 128 and/or the speakers 130 may perform the same or similar operations as the microphones 118 and/or speakers 120 associated with the voice-enabled device 102. Additionally, the antennas 132 may be configured to utilize dual-band radar functionality to receive data from within the environment. For example, the antennas 132 may be configured to send and receive electromagnetic waves in radio and/or microwave domains. At least one of the antennas 132 may be configured to send and receive electromagnetic waves having a bandwidth in the ultra-wide band range, such as a bandwidth at or around 60 GHZ. At least one other of the antennas 132 may be configured to send and receive electromagnetic waves having a bandwidth in the millimeter wave range, such as a bandwidth at or around 6 GHZ. It should be understood that while the examples used herein describe one antenna 132 associated with the ultra-wide band range and one antenna 132 associated with the millimeter band range, each or either of these antennas 132 may include multiple antennas and/or antenna arrays. Additionally, while specific bands are described herein, they are provided by way of example. The bandwidth may be, for example, about 4 GHz to about 10 GHZ, and/or from about 40 GHZ to about 80 GHZ. The antennas 132 may transmit the electromagnetic waves into the environment in which the sensing device 104 is located and may receive the electromagnetic waves back at the sensing device 104. The distortion and/or change in the electromagnetic waves as received by the sensing device 104 may indicate motion and/or a change in position of one or more objects within the environment. The changes in motion that may be detected may include, for example, entry and/or exit of a user from the environment, location of the user relative to the sensing device 102, number of users in the environment, an angle at which a user is positioned relative to the sensing device 102, a posture of a user, movement of a user within the environment, a direction of travel of a user, a size of a user, etc.

The electromagnetic waves may be received by the antennas 132, which may generate corresponding sensor data. The sensor data may be sent to the event-detection component 136, which may determine whether one or more predefined events has occurred based at least in part on the sensor data. For example, one or more models may be configured to receive the sensor data as input and determine if one or more characteristics associated with the sensor data correspond to reference sensor data associated with the predefined event(s). By way of example, in the case of a user fall, the sensor data may indicate that the position of the user has changed quickly from a standing to a prone or otherwise horizontal position and/or to a kneeling position. By way of additional example, the sensor data may indicate that a small child, such as an infant or a baby is present in the environment and another user enters the environment. By way of additional example, the sensor data may indicate a slouching motion of a user. Other examples may include pet detection and/or other object detection. In these example, zones may be utilized to determine if an event has occurred. For example, a zone may be set to a certain portion of the environment, such as a countertop for detecting the presence of a pet that is positioned on the countertop. The zones may be set by a user and/or determined from an analysis of the environment at issue. In these examples, the event-detection component 136 may analyze the sensor data with respect to reference data indicated to correspond to these and/or other events. When the event-detection component 136 determines that the sensor data corresponds to the reference sensor data, such as above a threshold confidence, the event-detection component 136 may identify, determine, and/or generate event data indicating that the predefined event has occurred. The event data may be sent from the sensing device 104 to the remote system 108 for processing. The AED component 134 will be described below in more detail.

It should be understood that while the sensing device 104 and the voice-enabled device 102 are shown as separate devices, the components and/or functionality described with respect to these two devices may embodied in a single device, such as a smart-home camera. For example, the sensing device 104 may include voice-enabled device functionality and/or the voice-enabled device 102 may include sensing and/or event-detection functionality. Additionally, the sensing device 104 may be a component of another device, such as a household device like a baby camera and/or baby monitor, a television, an appliance, a doorbell, a light and/or light switch, and/or one or more other devices having electronic components.

In examples, the sensing device 104 may be activated and/or the radar functionality may be activated upon the detection of a given event and/or occurrence. For example, the sensing device 104 and/or one or more other devices within the environment may include one or more infrared sensors and may detect the presence of a person. Enabling the radar functionality may be based at least in part on detecting the presence of the person. In other examples, a microphone situated in the environment may detect sound being made from the environment, such as footsteps of someone entering the environment, for example, and enabling the radar functionality may be based at least in part on detecting such sound.

The personal device 106 may include components such as, for example, one or more processors 138, one or more network interfaces 140, memory 142, one or more microphones 144, one or more speakers 146, one or more cameras 148, and/or one or more sensors 150. The microphones 144 and/or the speakers 146 may perform the same or similar operations as the microphones 118 and/or the speakers 120 as described with respect to the voice-enabled device 102. The cameras 148 may be configured to receive images from the environment and generate corresponding image data, which may be sent to the remote system 108. It should be understood that the cameras 148 may be in a default "off" mode unless specifically requested to be turned on by the user and/or when the user has provided permission to turn the cameras 148 on when a predefined event has been detected. The sensors 150 may include, for example, an accelerometer, a gyroscope, a heartbeat sensor, a liquid, such as perspiration, sensor, a global positioning system (GPS) sensor, and/or one or more other sensors configured to measure aspects of the personal device 106 and/or a user of the personal device 106.

The remote system 108 may include components such as, for example, a speech-processing system 152, a user registry 154, an event-detection component 156, an event bus 158, an AED component 160, a fusion component 162, a communications system 164, a notification component 166, and/or a device-selection component 168. It should be understood that while the speech-processing system 152 and the other components are depicted as separate from each other in FIG. 1, some or all of the components may be a part of the same system. The speech-processing system 152 may include an automatic speech recognition component (ASR) 170, a natural language understanding component (NLU) 172, and/or a text-to-speech component (TTS) 174. Each of the components described herein with respect to the remote system 108 may be associated with their own systems, which collectively may be referred to herein as the remote system 108, and/or some or all of the components may be associated with a single system. Additionally, the remote system 108 may include one or more applications, which may be described as skills. "Skills," as described herein may be applications and/or may be a subset of an application. For example, a skill may receive data representing an intent. For example, an intent may be determined by the NLU component 172 and/or as determined from user input via a computing device. Skills may be configured to utilize the intent to output data for input to the TTS component 174, a link or other resource locator for audio data, and/or a command to a device, such as the voice-enabled device 102.

In instances where a voice-enabled device 102 is utilized, skills may extend the functionality of accessory devices, including the sensing device 104, that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device 102. The application(s) may also be utilized, in examples, to receive input, such as from a user of the personal device 106 and/or the voice-enabled device 102, and send data and/or instructions associated with the input to one or more other devices.

The components of the remote system 108 are described in detail below. In examples, some or each of the components of the remote system 108 may include their own processor(s), network interface(s), and/or memory. As such, by way of example, the speech-processing system 152 may include and/or be associated with processor(s), network interface(s), and/or memory. The event-detection component 156 and/or the communications system 164 may include and/or be associated with different processor(s), network interface(s), and/or memory, or one or more of these components may utilize some or all of the same processor(s), network interface(s), and/or memory utilized by the speech-processing system 152. These components are described in detail below. Additionally, the operations and/or functionalities associated with and/or described with respect to the components of the remote system 108 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 154 may be configured to identify, determine, and/or generate associations between users, user accounts, and/or devices. For example, one or more associations between user accounts may be identified, determined, and/or generated by the user registry 154. The user registry 154 may additionally store information indicating one or more applications and/or resources accessible to and/or enabled for a given user account. Additionally, the user registry 154 may include information indicating device identifiers, such as naming identifiers, associated with a given user account, as well as device types associated with the device identifiers. The user registry 154 may also include information indicating user account identifiers, naming indicators of devices associated with user accounts, and/or associations between devices, such as the voice-enabled device 102, the sensing device 104, and the personal device 106. The user registry 154 may also include information associated with usage of the voice-enabled devices 102 and/or the personal device 106. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 152 may be configured to receive audio data from the voice-enabled device 102 and/or other devices and perform speech-processing operations. For example, the ASR component 170 may be configured to generate text data corresponding to the audio data, and the NLU component 172 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "Yes, I've fallen, call Rob," the NLU component 172 may identify a "call" intent and the payload may be "Rob." In this example where the intent data indicates an intent to establish a communication channel with a device associated with "Rob," the speech-processing system 152 may call one or more speechlets to effectuate the intent. Speechlets, as described herein may otherwise be described as applications and may include functionality for utilizing intent data to generate directives and/or instructions. For example, a communications speechlet may be called when the intent indicates that an action is to be performed associated with establishing a communication channel with another device. The speechlet may be designated as being configured to handle the intent of establishing a communication channel, for example. The speechlet may receive the intent data and/or other data associated with the user utterance from the NLU component 172, such as by an orchestrator of the remote system 108, and may perform operations to instruct the voice-enabled device 102 and/or the personal device 106 to perform an operation. For example, the communications speechlet may retrieve a device identifier of a device with which to establish a communication channel and may cause the communication channel to be established utilizing the remote system 108. The remote system 108 may generate audio data confirming that a communication channel has been established, such as by the TTS component 174. The audio data may be sent from the remote system 108 to the voice-enabled device 102 for output of corresponding audio by the speakers 120 of the voice-enabled device 102.

The event-detection component 156 may be configured to receive sensor data, such as from the sensing device 104, and determine whether a predefined event has occurred. For example, the sensor data generated by the sensing device 104 may be sent from the sensing device 104 to the remote system 108. The event bus 158 may receive the sensor data and determine that the sensor data is to be sent to the event-detection component 156 for processing. The event-detection component 156 may receive the sensor data from the event bus 158 and one or more models may be configured to receive the sensor data as input and determine if one or more characteristics associated with the sensor data correspond to reference sensor data associated with the predefined event(s). In examples, the sensor data may include audio data corresponding to audio received by the antennas 132 of the sensing device 104. By way of example, in the case of a user fall, the audio data may indicate that the position of the user has changed quickly from a standing to a prone or otherwise horizontal position and/or to a kneeling position. By way of additional example, the audio data may indicate that a small child, such as an infant or a baby is present in the environment and another user has entered the environment. By way of additional example, the audio data may indicate a slouching motion of a user. In these examples, the event-detection component 156 may analyze the audio data with respect to reference data indicated to correspond to these and/or other events. When the event-detection component 156 determines that the audio data corresponds to the reference audio data, such as above a threshold confidence, the event-detection component 156 may identify, determine, and/or generate event data indicating that the predefined event has occurred. In other examples, as described above, the event data may be generated by the event-detection component 136 of the sensing device 104.

The event bus 158 may be configured to receive the event data from the event-detection component 156 and/or the event-detection component 136 and may direct performance of one or more operations to confirm that the predefined event has occurred. For example, the device-selection component 168 may be called to determine which device is to be utilized to perform event-confirmation processes. To select a device, the device-selection component 168 may identify and/or determine a device identifier associated with the sensing device 104. The device-selection component 168 may utilize the device identifier to determine a user account associated with the device identifier. The user account may be an account stored in association with the user registry 154, and the user account may indicate device identifiers of other devices associated with the user account. The user account may also include information indicating a location of one or more of the other devices with respect to the environment and/or the functionality of some or all of those devices. In examples, the information may include an indication of a distance between a given device, such as the voice-enabled device 102, and the sensing device 104, a room designation associated with a given device, and whether a given device includes a microphone and/or a speaker. The device-selection component 168 may utilize this information and, in examples, data indicating a location of the predefined event, to determine which device to utilize for event-detection confirmation operations. In examples, the sensing device 104 may be selected for event-detection confirmation operations, particularly in examples where the sensing device includes the microphones 128 and the speakers 130. In other examples, the sensing device 104 may not include components and/or functionality for performing one or more of the event-detection confirmation operations and/or another device may be closer to the location of the predefined event and may be selected for performing the event-detection confirmation operations. In still other examples, multiple devices may be selected and/or utilized to perform the event-confirmation operations and/or portions thereof.

The confirmatory operations may include, in examples, sending data to the selected device. For purposes of illustration, the following example will be based on the event-selection component 168 selecting the voice-enabled device 102 for performing at least a portion of the event-confirmation operations. The data may represent instructions and/or commands for the voice-enabled device 102 to perform one or more operations. Those operations may include, in examples, causing the microphone 118 of the voice-enabled device 102 to capture audio from the environment and send corresponding audio data to the remote system 108 for AED analysis. In other examples, the microphone 118 of the voice-enabled device 102 may already be configured to capture audio, and in these examples, the operations may include causing the voice-enabled device 102 to send the generated audio data to the remote system 108 for AED analysis. In still other examples, AED may be performed by the voice-enabled device 102 in addition to and/or instead of by the remote system 108. In these examples, the operations may include causing the AED component 121 to be enabled or otherwise turned on, or the operations may include causing the AED component 121 to transition from a first mode to a second mode representing a higher sensitivity to audio data generated by the microphone 118. The AED component 121 may utilize the audio data generated by the microphone 118 to determine if an audio fingerprint of the audio data, or portion thereof, corresponds to a reference audio fingerprint associated with the predefined event. For example, the one or more predefined events may be associated with one or more reference audio fingerprints characteristic of sound made when the event occurs. For example, the sound of a human body hitting a floor in the event of a fall may have a given audio fingerprint, a person expressing pain and/or disorientation may have another audio fingerprint, glass breaking may have yet another audio fingerprint, etc. The AED component 121 may receive an indication, such as from the event-detection component 136, 156 of the type of predefined event that has been detected and may utilize reference audio fingerprints associated with that event type for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 121 may determine that the audio fingerprint corresponds to at least one of the reference audio fingerprints, such as to a given confidence level, and may generate confirmatory data indicating that the audio fingerprint corresponds to the at least one reference audio fingerprint. The confirmatory data may be sent to a fusion component 162 of the remote system 108 for further processing.

Additionally, in examples, AED analysis may include generating reference labels for given frames corresponding to an event and then training a classifier to predict a binary frame label. In other examples, a model may be generated without aggregation heuristics for utterance-level prediction. In these examples, a frame-level loss approach may be combined with an utterance-level loss approach, which may share a single classifier that can be seen as the vectorial representation of an event. The approaches may be connected by an attention mechanism. The analysis may also include utilizing multiple layers of recurrent neural networks for feature extraction from raw features. Utilizing the methods described herein, instances of the same event type may occur with somewhat different speeds and durations, and to account for such differences a multi-resolution feature extraction architecture based on recurrent neural networks may be utilized. After analyzing recurrent layers, subsampling in the time axis with a rate of 2, for example, may be utilized to output an average of cells for two neighboring frames. Thereafter, upsampling or otherwise replicating the subsampled output sequences from each recurrent layer may be performed and then summed for corresponding frames. The final frame representation produced by this methodology may take into account information at different resolutions. The final frame representation may be compared to reference frames indicated to correspond to an event of interest.

It should be understood that while the AED component 121 of the voice-enabled device 102 is described as performing the AED confirmatory operations, the AED component 134 of the sensing device 104 and/or the AED component 160 of the remote system 108 may additionally, or alternatively, perform the AED confirmatory operations, or a portion thereof.

Additionally, or alternatively, when an indication that a predefined event has occurred is identified, determined, generated, and/or received, the performance of event-confirmation operations associated with natural language understanding techniques may occur. For example, based at least in part on the indication of the predefined event occurring and/or the type of event, the TTS component 174 may generate audio data representing a request for audible confirmation that the predefined event has occurred. For example, the request may be "A fall has been detected. Are you okay?" The audio data may be sent from the remote system 108 to the selected device, such as the voice-enabled device 102, which may cause the voice-enabled device to output audio representing the request via the speaker 120. The user and/or another user in the environment may provide an audible response to the request. The response may confirm or refute that the predefined event occurred.

For example, when the request includes "Are you okay?" a response of "no" may indicate that the predefined event occurred while a response of "yes" may indicate that the predefined event did not occur. The microphone 118 of the voice-enabled device 102 may receive audio representing the response and may generate corresponding audio data. The audio data may be sent to the remote system 108 for speech processing, which may include generating, utilizing the ASR component 170, text data corresponding to the audio data. The text data may be utilized by the NLU component 172 to determine intent data representing the response. The intent data and/or data indicating whether the natural language understanding processes resulted in confirmation of event occurrence may be sent to the fusion component 162 of the remote system 108. It should be understood the while the voice-enabled device 102 is described as outputting audio representing the request and receiving audio representing the response, these operations may be performed by one or more other devices, such as the sensing device 104 and/or the personal device.

The fusion component 162 may be configured to receive the event data indicating that the predefined event occurred and/or may receive the confirmatory data from the AED component 121, 134, 160 and/or the NLU component 172. The fusion component 162 may utilize some or all of this information to determine whether to confirm that the predefined event occurred, whether to perform additional event-confirmation operations, and/or whether to take one or more actions in response to the predefined event. For example, the fusion component 162 may determine that an action is to be taken without event-confirmation operations when a confidence value associated with the indication that the predefined event occurred is greater than a threshold confidence. In other examples, the fusion component 162 may determine that confirmation operations are to be performed utilizing the AED component 121, 134, 160, as described herein. In still other examples, the fusion component 162 may determine that confirmation operations are to be performed utilizing the NLU component 172, as described herein. The confirmatory data from the AED component 121, 134, 160 and/or the NLU component 172 may be sent to the fusion component 162 and may be utilized to determine if additional event-confirmation operations are to be performed. For example, when the confirmatory data from the AED component 121, 134, 160 indicates that the audio fingerprint corresponds to the reference audio fingerprint at below a given threshold confidence, the fusion component 162 may determine that NLU confirmation operations should be initiated. In other examples when NLU is utilized prior to AED, when the confirmatory data indicates that no response was provided by a user in the environment and/or when the response does not indicate confirmation of the event occurring, such as above a threshold confidence, the fusion component 162 may determine that AED confirmation operations should be initiated.

Additionally, or alternatively, the fusion component 162 may receive additional inputs from the sensing device 104, the voice-enabled device 102, and/or another device and may utilize those inputs for confirming whether the predefined event occurred. For example, inputs such as accelerometer data from the sensors 150 of the personal device 106 associated with the user may be received and utilized to confirm whether the event occurred and/or to send notifications to. The inputs may also include image data in examples where a device, such as the personal device 106, located in the environment includes a camera 148. In these examples, computer vision techniques may be utilized to identify objects represented in the image data as well as information associated with the objects, such as posture, color, movement, etc. Additional inputs may include beacon data from the personal device 106 associated with a user. The beacon data may indicate that the personal device 106 is located in the environment. In still other examples, the personal device 106 may be caused to vibrate and/or display a request for user input to confirm or refute that the predefined event has occurred. Input data indicating the user has selected to confirm event occurrence may be utilized by the fusion component 162. Additional input data may be an indication from a user device. For example, when an event is detected, a user alert may be sent to a user device, such as a personal device 106. The user may provide input to the user device that indicates confirmation of the event occurring. Corresponding input data may be utilized by the fusion component 162 to confirm event occurrence.

The fusion component 162 may use one or more model and/or machine-learning techniques to confirm event occurrence and/or to select actions to be performed. For example, predictive models may utilize predictive analytic techniques to confirm event occurrence. The predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether a given sound from an environment will indicate that a given event has occurred. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models for future events. By so doing, the predictive models may utilize data as well as features from other systems as described herein, to predict or otherwise determine an outcome. Outcome prediction may be deterministic such that the outcome is determined to occur or not occur. Additionally, or alternatively, the outcome prediction may be probabilistic such that the outcome is determined to occur to a certain probability and/or confidence. The features described herein may be individual measurable properties or characteristics of the observed outcome. A feature may be numeric and/or may include one or more strings and/or graphs. In examples, the feature may correspond to an explanatory variable, such as when statistical techniques are utilized when generating and/or utilizing predictive models. The features may be utilized as inputs by the predictive models to predict the outcome, as described herein. The outcomes may be utilized to determine whether an event has occurred, whether an audio fingerprint corresponds to a reference audio fingerprint, and/or whether a user response to a request for confirmation of event occurrence confirms occurrence.

The fusion component 162 may also utilize the indication of the event and/or the confirmatory data to determine whether an action is to be performed. For example, the fusion component 162 may confirm that the predefined event occurred and may cause one or more components of the remote system 108 to perform an action. The action may include, for example, sending a notification of event occurrence to a designated device, such as the sensing device 104, the voice-enabled device 102, and/or another device 176. The action may also include causing a communication channel to be established between the selected device and the other device 176 designated for contact when the event occurs. The action may also include sending a notification, utilizing the notification component 166, and/or establishing a communication channel, utilizing the communications system 164, with an emergency service provider system 176. The action may also include causing an alarm to activate. Additional and/or different actions may be taken and may be selected based at least in part on the event type at issue and/or the confidence value associated with confirming that the event occurred. When a notification is to be sent, the notification component 166 may be configured to receive data from the fusion component 162 and/or the event bus 158 instructing the notification component to generate a notification.

The notification component 166 may receive an indication of the type of event that has been detected as well as which device detected the event and information associated with the device, the environment, and/or the user account associated with the device. The notification may include an indication that the event has been detected and, in examples, a request for input in response to the notification. The notification may be sent to a device 176 that has been designated to receive notifications when a given event occurs. The device 176 to receive the notification may be associated with a user account of a user, such as a family member, friend, and/or neighbor who may be able to provide assistance when an event is detected.

The communications system 164 may receive the indication of the type of event that has been detected as well as which device detected the event and the information associated with the device, the environment, and/or the user account associated with the device. The communications system may identify the device identifier of the selected device utilized for NLU confirmation operations and/or another device associated with the user account. The communications system may also identify the device identifier of the other device 176 that will have the communication channel established therewith. The other device 176 may be selected based at least in part on the event type, the confidence at which event occurrence was confirmed, and/or user preferences. The other device 176 may be associated with a family member, friend, and/or neighbor, for example. In other examples, the other device 176 may be associated with an emergency-services provider and/or system that may provide and/or send aid to a user in the environment.

It should be noted that while text data is described as a type of data utilized to communicate between various components of the remote system 108 and/or other systems and/or devices, the components of the remote system 108 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the voice-enabled device 102.

As shown in FIG. 1, several of the components of the remote system 108 and the associated functionality of those components as described herein may be performed by one or more of the voice-enabled device 102, the sensing device 104, and/or the personal device 106. Additionally, or alternatively, some or all of the components and/or functionalities associated with the voice-enabled device 102, the sensing device 104, and/or the personal device 106 may be performed by the remote system 108.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 112, 122, 138, and/or the processor(s) described with respect to the components of the remote system 108, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112, 122, 138, and/or the processor(s) described with respect to the components of the remote system 108 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112, 122, 138, and/or the processor(s) described with respect to the components of the remote system 108 may possess its own local memory, which also may store program components, program data, and/or one or more operating systems.

The memory 116, 126, 142, and/or the memory described with respect to the components of the remote system 108 may include volatile and nonvolatile memory, removable and non-removable media implemented in any method or technology for storage of information, such as computer-readable instructions, data structures, program component, or other data. Such memory 116, 126, 142, and/or the memory described with respect to the components of the remote system 108 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116, 126, 142, and/or the memory described with respect to the components of the remote system 108 may be implemented as computer-readable storage media ("CRSM"), which may be any available physical media accessible by the processor(s) 112, 122, 138, and/or the processor(s) described with respect to the remote system 108 to execute instructions stored on the memory 116, 126, 142, and/or the memory described with respect to the components of the remote system 108. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116, 126, 142, and/or the memory described with respect to the components of the remote system 108, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants; a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden: and so forth.

The network interface(s) 114, 124, 140, and/or the network interface(s) described with respect to the components of the remote system 108 may enable messages between the components and/or devices shown in system 100 and/or with one or more other polling systems, as well as other networked devices. Such network interface(s) 114, 124, 140, and/or the network interface(s) described with respect to the components of the remote system 108 may include one or more network interface controllers (NICs) or other types of transceiver devices to send and receive messages over the network 110.

For instance, each of the network interface(s) 114, 124, 140, and/or the network interface(s) described with respect to the components of the remote system 108 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114, 124, 140, and/or the network interface(s) described with respect to the components of the remote system 108 may include a wide area network (WAN) component to enable message over a wide area network.

In some instances, the remote system 108 may be local to an environment associated the voice-enabled devices 102, the sensing device 104, and/or the personal device 106. For instance, the remote system 108 may be located within one or more of the voice-enabled devices 102, the sensing device 104, and/or the personal device 106. In some instances, some or all of the functionality of the remote system 108 may be performed by one or more of the voice-enabled devices 102, the sensing device 104, and/or the personal device 106. Also, while various components of the remote system 108 have been labeled and named in this disclosure and each component has been described as being configured to cause the processor(s) to perform certain operations, it should be understood that the described operations may be performed by some or all of the components and/or other components not specifically illustrated.

Figure 2:
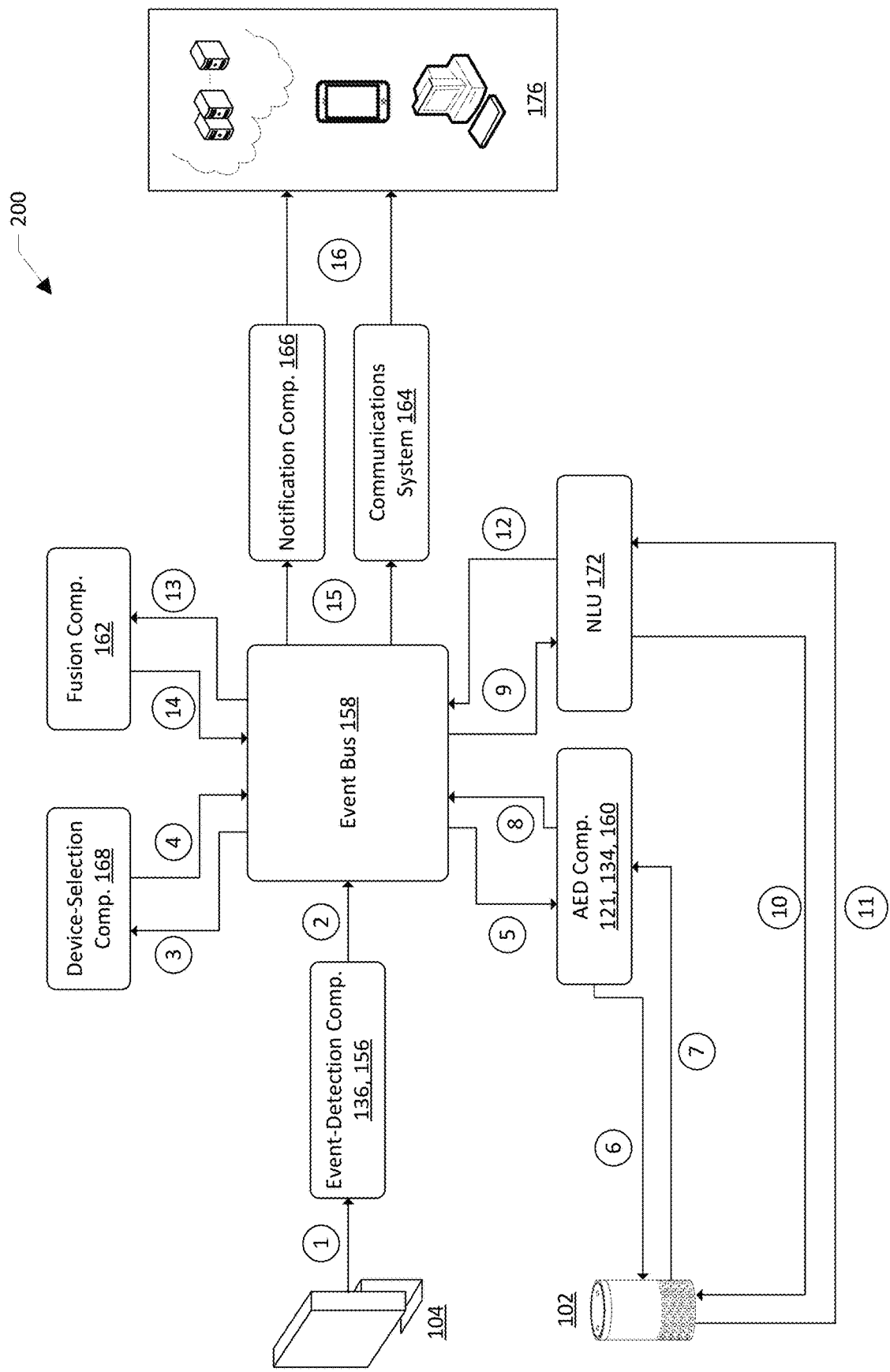
FIG. 2 illustrates a conceptual diagram of example components of a system for event-detection confirmation.

FIG. 2 illustrates a conceptual diagram of example components of a system 200 for event-detection confirmation. The system 200 may include the same or similar components as the system 100 described with respect to FIG. 1. For example, the system 200 may include a voice-enabled device 102, a sensing device 104, another device 176, an event-detection component 136, 156, a device-selection component 168, an event bus 158, an AED component 121, 134, 160, an NLU component 172, a fusion component 162, a notification component 166, and/or a communications system 164. FIG. 2 depicts the exchange of information and/or the performance of processes via the various components utilizing steps 1-16. However, it should be understood that the processes may be performed in any order and need not be performed in sequential order as depicted in FIG. 2.

At step 1, the sensing device 104 may generate sensor data utilizing, for example, dual-band radar functionality and the sensing device 104 may send the sensor data to a remote system. The sensing device 104 may include components such one or more antennas. The antennas may be configured to utilize dual-band radar functionality to receive data from within the environment. For example, the antennas may be configured to send and receive electromagnetic waves in radio and/or microwave domains. At least one of the antennas may be configured to send and receive electromagnetic waves having a bandwidth in the ultra-wide band range, such as a bandwidth at or around 60 GHZ. At least one other of the antennas may be configured to send and receive electromagnetic waves having a bandwidth in the millimeter wave range, such as a bandwidth at or around 6 GHZ. It should be understood that while the examples used herein describe one antenna associated with the ultra-wide band range and one antenna associated with the millimeter band range, each or either of these antennas may include multiple antennas and/or antenna arrays. The antennas may transmit the electromagnetic waves into the environment in which the sensing device 104 is located and may receive the electromagnetic waves back at the sensing device 104. The distortion and/or change in the electromagnetic waves as received by the sensing device 104 may indicate motion and/or a change in position of one or more objects within the environment. The changes in motion that may be detected may include, for example, entry and/or exit of a user from the environment, location of the user relative to the sensing device 104, number of users in the environment, an angle at which a user is positioned relative to the sensing device 104, a posture of a user, movement of a user within the environment, a direction of travel of a user, a size of a user, etc. The electromagnetic waves may be received by the antennas, which may generate corresponding audio data.

At step 2, the audio data may be sent to the event-detection component 136, 156, which may determine whether one or more predefined events has occurred based at least in part on the audio data. For example, one or more models may be configured to receive the audio data as input and determine if one or more characteristics associated with the audio data correspond to reference audio data associated with the predefined event(s). By way of example, in the case of a user fall, the audio data may indicate that the position of the user has changed quickly from a standing to a prone or otherwise horizontal position and/or to a kneeling position. By way of additional example, the audio data may indicate that a small child, such as an infant or a baby is present in the environment and another user enters the environment. By way of additional example, the audio data may indicate a slouching motion of a user. In these examples, the event-detection component 136, 156 may analyze the audio data with respect to reference data indicated to correspond to these and/or other events. When the event-detection component 136, 156 determines that the audio data corresponds to the reference audio data, such as above a threshold confidence, the event-detection component 136, 156 may identify, determine, and/or generate event data indicating that the predefined event has occurred. In examples, the event-detection component 136 may be a component of the sensing device 104. In other examples, the event-detection component 156 may be a component of the remote system. The event data may be sent from the event-detection component 136, 156 to the event bus 158, which may facilitate the sending of the event data and/or other data to one or more components of the remote system.

At step 3, the process may include sending the event data and/or other data to the device-selection component 168 to determine which device to utilize for event-confirmation operations. For example, the device-selection component 168 may identify and/or determine a device identifier associated with the sensing device 104. The device-selection component 168 may utilize the device identifier to determine a user account associated with the device identifier. The user account may be an account stored in association with the user registry, and the user account may indicate device identifiers of other devices associated with the user account. The user account may also include information indicating a location of one or more of the other devices with respect to the environment and/or the functionality of some or all of those devices. In examples, the information may include an indication of a distance between a given device, such as the voice-enabled device 102 and the sensing device 104, a room designation associated with a given device, and/or whether a given device includes a microphone and/or a speaker. The device-selection component 168 may utilize this information and, in examples, data indicating a location of the predefined event, to determine which device to utilize for event-detection confirmation operations. In examples, the sensing device 104 may be selected for event-detection confirmation operations, particularly in examples where the sensing device includes a microphone and a speaker. In other examples, the sensing device 104 may not include components and/or functionality for performing one or more of the event-detection confirmation operations and/or another device may be closer to the location of the predefined event and may be selected for performing the event-detection confirmation operations. In still other examples, multiple devices may be selected and/or utilized to perform the event-confirmation operations and/or portions thereof.

At step 4, the device-selection component 168 may send data indicating the selected device(s) for event-confirmation operations to the event bus 158. The event bus 158 may utilize the data from the device-selection component 168 to determine which device to send commands to for event-confirmation operations.

At step 5, the event bus 158 may send one or more commands and/or data to the AED component 121, 134, 160 to perform one or more operations associated with event-confirmation. For purposes of illustration, the following example will be based on the event-selection component 168 selecting the AED component 121 of the voice-enabled device 102 for performing at least a portion of the event-confirmation operations. It should be understood however that the AED component 134 of the sensing device 104 and/or the AED component 160 of the remote system may be utilized instead of or in addition to the AED component 121 of the voice-enabled device 102. The data may represent instructions and/or commands for the voice-enabled device 102 to perform one or more operations. Those operations may include, in examples, causing the microphone of the voice-enabled device 102 to capture audio from the environment and send corresponding audio data to the remote system for AED analysis. In other examples, the microphone of the voice-enabled device 102 may already be configured to capture audio, and in these examples, the operations may include causing the voice-enabled device 102 to send the generated audio data to the remote system for AED analysis. In still other examples, AED may be performed by the voice-enabled device 102 in addition to and/or instead of by the remote system.

In these examples, at step 6, the operations may include causing the AED component 121 to be enabled or otherwise turned on, or the operations may include causing the AED component 121 to transition from a first mode to a second mode representing a higher sensitivity to audio data generated by the microphone. The microphone may capture audio from within the environment and generate corresponding audio data.

At step 7, the AED component 121 may utilize the audio data generated by the microphone to determine if an audio fingerprint of the audio data, or portion thereof, corresponds to a reference audio fingerprint associated with the predefined event. For example, the one or more predefined events may be associated with one or more reference audio fingerprints characteristic of sound made when the event occurs. For example, the sound of a human body hitting a floor in the event of a fall may have a given audio fingerprint, a person expressing pain and/or disorientation may have another audio fingerprint, glass breaking may have yet another audio fingerprint, etc. The AED component 121 may receive an indication, such as from the event-detection component 136, 156 and/or the event bus 158 of the type of predefined event that has been detected and may utilize reference audio fingerprints associated with that event type for analysis in association with the audio fingerprint in question. The AED component 121 may determine that the audio fingerprint corresponds to at least one of the reference audio fingerprints, such as to a given confidence level, and may generate confirmatory data indicating that the audio fingerprint corresponds to the at least one reference audio fingerprint.

At step 8, the AED component 121 may send the confirmatory data to the event bus 158 of the remote system.

At step 9, based at least in part on the confirmatory data from the AED component 121, 134, 160 and/or a confidence value associated with the confirmatory data and/or the event data, the event bus 158 may send one or more commands and/or data to the NLU component 172 to perform one or more operations associated with event-confirmation. It should be understood that the event-confirmation processes performed using the NLU component 172 may be performed prior to, in parallel with, and/or instead of the event-confirmation processes performed using the AED component 121, 134, 160.

At step 10, the TTS component may generate audio data representing a request for audible confirmation that the predefined event has occurred. For example, the request may be "A fall has been detected. Are you okay?" The audio data may be sent from the remote system to the selected device, such as the voice-enabled device 102, which may cause the voice-enabled device 102 to output audio representing the request via the speaker. The user and/or another user in the environment may provide an audible response to the request. The response may confirm or refute that the predefined event occurred. For example, when the request includes "Are you okay?" a response of "no" may indicate that the predefined event occurred while a response of "yes" may indicate that the predefined event did not occur.

At step 11, the microphone of the voice-enabled device 102 may receive audio representing the response and may generate corresponding audio data. The audio data may be sent to the remote system for speech processing, which may include generating, utilizing an ASR component, text data corresponding to the audio data. The text data may be utilized by the NLU component 172 to determine intent data representing the response. It should be understood the while the voice-enabled device 102 is described as outputting audio representing the request and receiving audio representing the response, these operations may be performed by one or more other devices, such as the sensing device 104 and/or a personal device. In examples, the NLU component 172 may determine that the intent data corresponds to an intent to confirm event occurrence. For example, responses that include phrases such as "yes," "please help," "help." "call for help," "I've fallen," "call 911," etc. may be compared to intents designated as indicating event confirmation. The NLU component 172 and/or another component of the remote system may generate confirmatory data indicating that the event has been confirmed to occur.

At step 12, the confirmatory data may be sent from the NLU component 172 to the event bus 158 of the remote system.

At step 13, the event bus may send the event data indicating that the predefined event occurred and/or the confirmatory data from the AED component 121, 134, 160 and/or the NLU component 172 to the fusion component 162. The fusion component 162 may utilize some or all of this information to determine whether to confirm that the predefined event occurred, whether to perform additional event-confirmation operations, and/or whether to take one or more actions in response to the predefined event. For example, the fusion component 162 may determine that an action is to be taken without event-confirmation operations when a confidence value associated with the indication that the predefined event occurred is greater than a threshold confidence. In other examples, the fusion component 162 may determine that confirmation operations are to be performed utilizing the AED component 121, 134, 160, as described herein. In still other examples, the fusion component 162 may determine that confirmation operations are to be performed utilizing the NLU component 172, as described herein. The confirmatory data from the AED component 121, 134, 160 and/or the NLU component 172 may be sent to the fusion component 162 and may be utilized to determine if additional event-confirmation operations are to be performed. For example, when the confirmatory data from the AED component 121, 134, 160 indicates that the audio fingerprint corresponds to the reference audio fingerprint at below a given threshold confidence, the fusion component 162 may determine that NLU confirmation operations should be initiated. In other examples when NLU is utilized prior to AED, when the confirmatory data indicates that no response was provided by a user in the environment and/or when the response does not indicate confirmation of the event occurring, such as above a threshold confidence, the fusion component 162 may determine that AED confirmation operations should be initiated.

Additionally, or alternatively, the fusion component 162 may receive additional inputs from the sensing device 104, the voice-enabled device 102, and/or another device and may utilize those inputs for confirming whether the predefined event occurred. For example, inputs such as accelerometer data from the sensors of the personal device associated with the user may be received and utilized to confirm whether the event occurred and/or to send notifications to. The inputs may also include image data in examples where a device, such as the personal device, located in the environment includes a camera. In these examples, computer vision techniques may be utilized to identify objects represented in the image data as well as information associated with the objects, such as posture, color, movement, etc. Additional inputs may include beacon data from the personal device associated with a user. The beacon data may indicate that the personal device is located in the environment. In still other examples, the personal device may be caused to vibrate and/or display a request for user input to confirm or refute that the predefined event has occurred. Input data indicating the user has selected to confirm event occurrence may be utilized by the fusion component 162.

The fusion component 162 may also utilize the indication of the event and/or the confirmatory data to determine whether an action is to be performed. For example, the fusion component 162 may confirm that the predefined event occurred and may cause one or more components of the remote system to perform an action. The action may include, for example, sending a notification of event occurrence to a designated device, such as the sensing device 104, the voice-enabled device 102, and/or another device 176. The action may also include causing a communication channel to be established between the selected device and the other device 176 designated for contact when the event occurs. The action may also include sending a notification and/or establishing a communication channel with an emergency service provider system 176. The action may also include causing an alarm to activate. Additional and/or different actions may be taken and may be selected based at least in part on the event type at issue and/or the confidence value associated with confirming that the event occurred.

At step 14, the fusion component 162 may send data to the event bus 158 including a selection of an action to be performed and a payload associated with that action, such as text data to be utilized for sending a notification and/or device identifiers associated with devices with which to establish a communication channel.

At step 15, the event bus 158 may send a command to the notification component 166 and/or the communications system 164 to perform the action(s) selected by the fusion component 162. For example, the notification component 166 may receive an indication of the type of event that has been detected as well as which device detected the event and information associated with the device, the environment, and/or the user account associated with the device. The notification may include an indication that the event has been determined and, in examples, a request for input in response to the notification. Additionally, or alternatively, the communications system 164 may receive the indication of the type of event that has been detected as well as which device detected the event and the information associated with the device, the environment, and/or the user account associated with the device. The communications system 164 may identify the device identifier of the selected device utilized for NLU confirmation operations and/or another device associated with the user account. The communications system may also identify the device identifier of the other device 176 that will have the communication channel established therewith. The other device 176 may be selected based at least in part on the event type, the confidence at which event occurrence was confirmed, and/or user preferences. The other device 176 may be associated with a family member, friend, and/or neighbor. In other examples, the other device 176 may be associated with an emergency-services provider and/or system that may provide and/or send aid to a user in the environment.

At step 16, the notification may be sent to a device 176 that has been designated to receive notification when a given event occurs. The device 176 to receive the notification may be associated with a user account of a user, such as a family member, friend, and/or neighbor who may be able to provide assistance when an event is detected. Additionally, or alternatively, the communication channel may be established with the device 176 utilizing the communications system 164.

Figure 3:
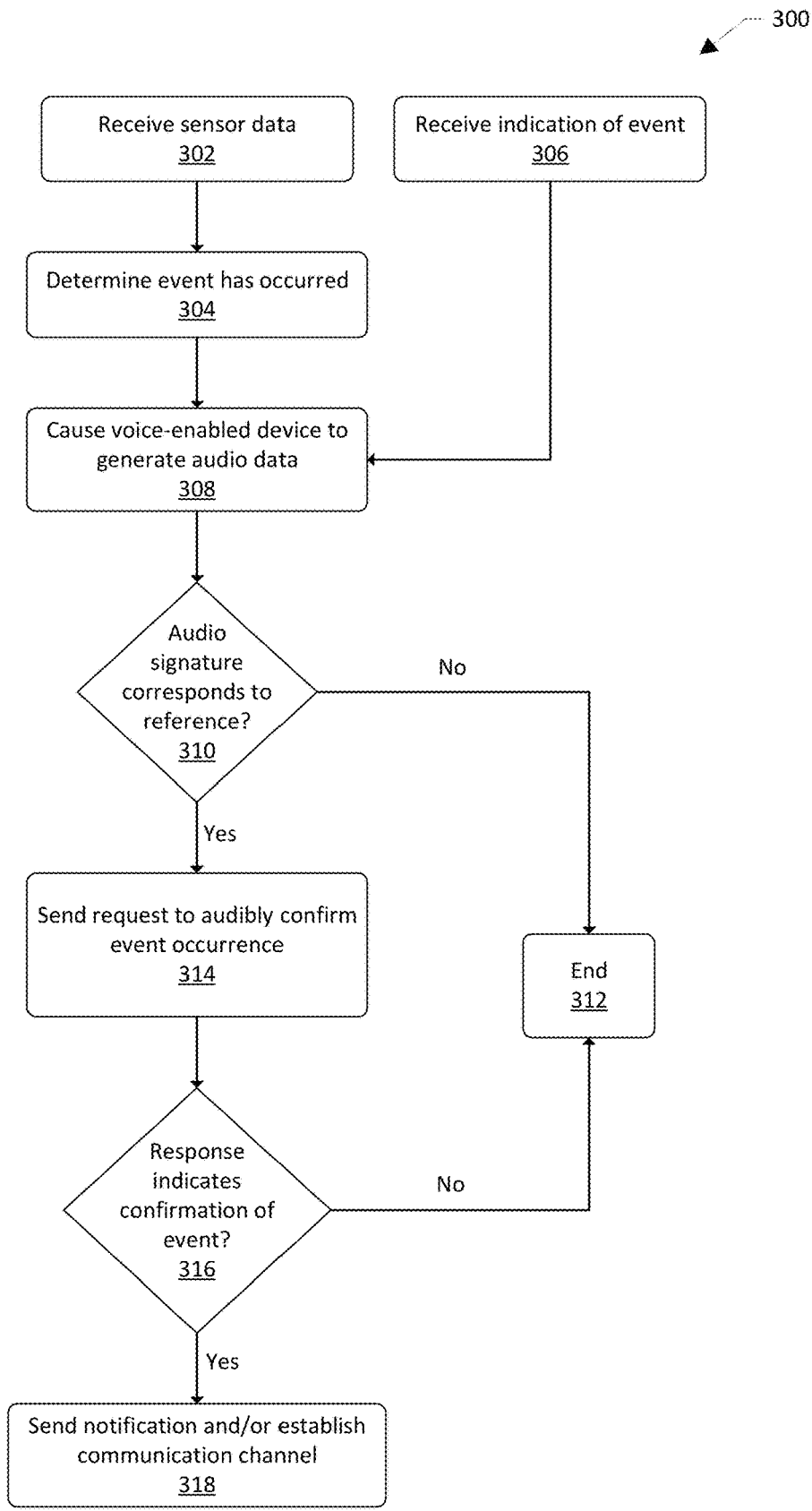
FIG. 3 illustrates a flow diagram of an example process for event-detection confirmation.
Figure 4:
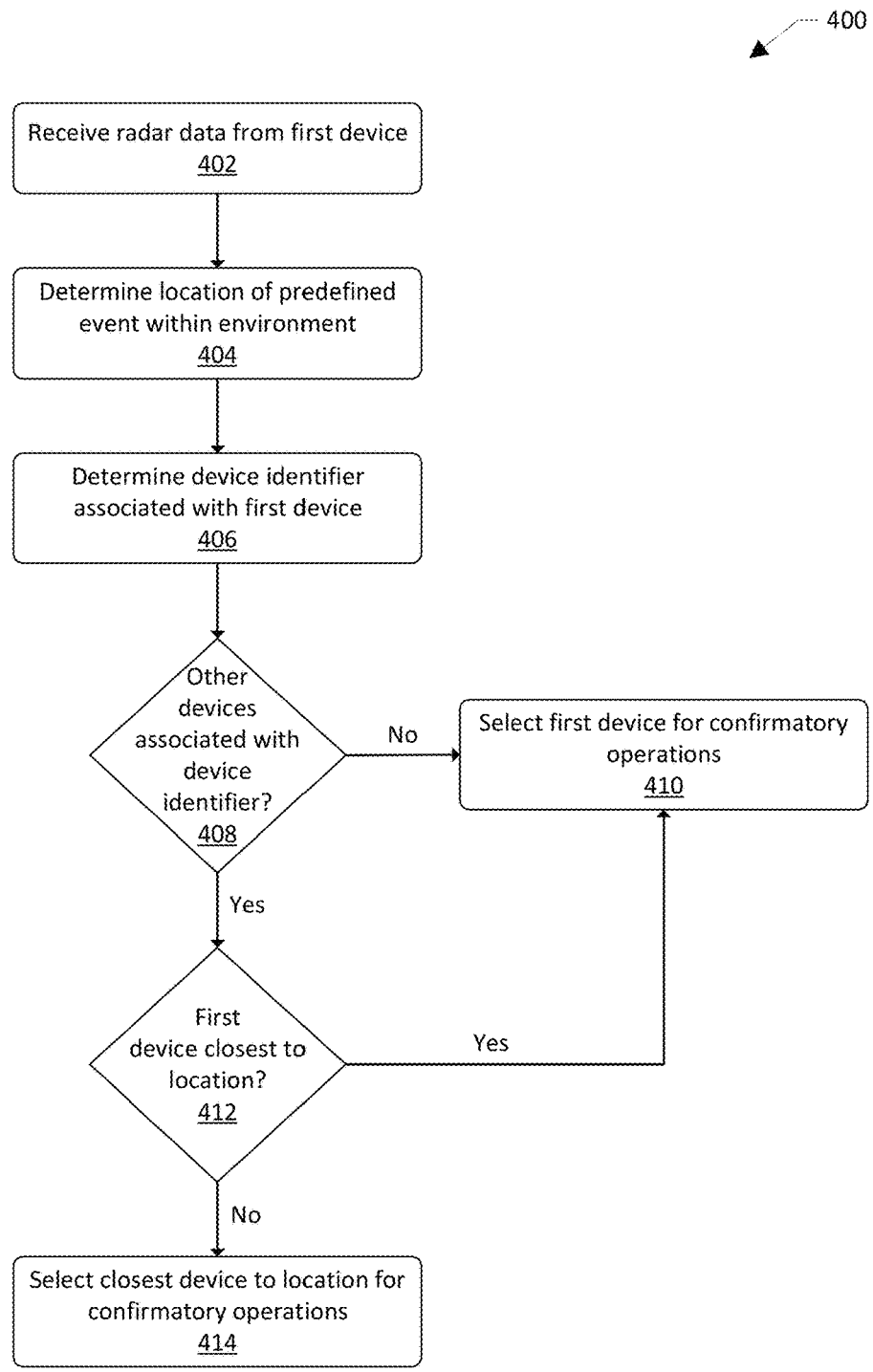
FIG. 4 illustrates a flow diagram of an example process for device selection associated with event-detection confirmation systems.

FIGS. 3 and 4 illustrate processes for event-detection confirmation. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, 5, and 9-11, although the processes may be implemented in a wide variety of other environments, architectures and systems.

FIG. 3 illustrates a flow diagram of an example process for event-detection confirmation. The order in which the operations or steps are described is not intended to be construed as a limitation, and any number of the described operations may be combined in any order and/or in parallel to implement process 300.

At block 302, the process 300 may include receiving sensor data. For example, a sensing device may generate sensor data utilizing, for example, dual-band radar functionality and the sensing device may send the sensor data to a remote system. The sensing device may include components such one or more antennas. The antennas may be configured to utilize dual-band radar functionality to receive data from within the environment. For example, the antennas may be configured to send and receive electromagnetic waves in radio and/or microwave domains. At least one of the antennas may be configured to send and receive electromagnetic waves having a bandwidth in the ultra-wide band range, such as a bandwidth at or around 60 GHZ. At least one other of the antennas may be configured to send and receive electromagnetic waves having a bandwidth in the millimeter wave range, such as a bandwidth at or around 6 GHZ. The antennas may transmit the electromagnetic waves into the environment in which the sensing device is located and may receive the electromagnetic waves back at the sensing device. The distortion and/or change in the electromagnetic waves as received by the sensing device may indicate motion and/or a change in position of one or more objects within the environment. The electromagnetic waves may be received by the antennas, which may generate corresponding audio data.

At block 304, the process 300 may include determining that an event has occurred based at least in part on the sensor data. For example, the audio data may be sent to an event-detection component, which may determine whether one or more predefined events has occurred based at least in part on the audio data. For example, one or more models may be configured to receive the audio data as input and determine if one or more characteristics associated with the audio data correspond to reference audio data associated with the predefined event(s). When the event-detection component determines that the audio data corresponds to the reference audio data, such as above a threshold confidence, the event-detection component may identify, determine, and/or generate event data indicating that the predefined event has occurred. In these examples, the event-detection component may be a component of the remote system.

In addition to, or instead of, receiving the sensor data at block 302 and determining that the event has occurred, the process 300, at block 306, may include receiving an indication of the event occurring, such as from the sensing device. For example, the sensing device, in addition to generating the sensor data, may perform the event-detection operations described with respect to block 304. In these examples, the event data may be sent from the sensing device to the remote system.

At block 308, the process 300 may include causing a voice-enabled device to generate audio data. The remote system may send one or more commands and/or data to an AED component to perform one or more operations associated with event-confirmation. The data may represent instructions and/or commands for the voice-enabled device to perform one or more operations. Those operations may include, in examples, causing the microphone of the voice-enabled device to capture audio from the environment and send corresponding audio data to the remote system for AED analysis. In other examples, the microphone of the voice-enabled device may already be configured to capture audio, and in these examples, the operations may include causing the voice-enabled device to send the generated audio data to the remote system for AED analysis. In still other examples, AED may be performed by the voice-enabled device 102 in addition to and/or instead of by the remote system. In these examples the operations may include causing the AED component to be enabled or otherwise turned on, or the operations may include causing the AED component to transition from a first mode to a second mode representing a higher sensitivity to audio data generated by the microphone. The microphone may capture audio from within the environment and generate corresponding audio data.

At block 310, the process 300 may include determining whether an audio fingerprint of the audio data corresponds to one or more reference audio fingerprints indicating that the event has occurred. For example, the AED component may utilize the audio data generated by the microphone to determine if an audio fingerprint of the audio data, or portion thereof, corresponds to a reference audio fingerprint associated with the predefined event. For example, the one or more predefined events may be associated with one or more reference audio fingerprints characteristic of sound made when the event occurs. For example, the sound of a human body hitting a floor in the event of a fall may have a given audio fingerprint, a person expressing pain and/or disorientation may have another audio fingerprint, glass breaking may have yet another audio fingerprint, etc. The AED component may receive an indication, such as from the event-detection component, of the type of predefined event that has been detected and may utilize reference audio fingerprints associated with that event type for analysis in association with the audio fingerprint in question.

If the audio fingerprint does not correspond to the reference audio fingerprint, the process 300 may proceed to block 312 where the process 300 may end. In these examples, the AED confirmation operations may indicate that the event did not occur or otherwise that the detection of the event was a false positive. In other examples, such as where a user setting has been selected, a notification of the possible event may be sent to a selected device in case the AED confirmation operations did not accurately determine that the event detection was a false positive.

If the audio fingerprint corresponds to the reference audio fingerprint, the process 300 may proceed to block 314 where the process 300 may include sending audio data to a voice-enabled device requesting an audible confirmation that the event occurred. For example, based at least in part on the confirmatory data from the AED component and/or a confidence value associated with the confirmatory data and/or the event data, the remote system may send one or more commands and/or data to a NLU component to perform one or more operations associated with event-confirmation.

A TTS component may generate audio data representing a request for audible confirmation that the predefined event has occurred. For example, the request may be "A fall has been detected. Are you okay?" The audio data may be sent from the remote system to the selected device, such as the voice-enabled device, which may cause the voice-enabled device to output audio representing the request via the speaker. The user and/or another user in the environment may provide an audible response to the request. The response may confirm or refute that the predefined event occurred. For example, when the request includes "Are you okay?" a response of "no" may indicate that the predefined event occurred while a response of "yes" may indicate that the predefined event did not occur.

At block 316, the process 300 may include determining whether audio data representing a response to the request indicates confirmation of the event. For example, the microphone of the voice-enabled device may receive audio representing the response and may generate corresponding audio data. The audio data may be sent to the remote system for speech processing, which may include generating, utilizing an ASR component, text data corresponding to the audio data. The text data may be utilized by the NLU component to determine intent data representing the response. It should be understood the while the voice-enabled device is described as outputting audio representing the request and receiving audio representing the response, these operations may be performed by one or more other devices, such as the sensing device and/or a personal device.

If the response does not indicate that the event did not occur, the process 300 may proceed to block 312 where the process 300 may end.

If the response indicates that the event occurred and/or if no response was received, the process 300 may continue to block 318 where the system may send a notification to one or more devices and/or establish a communication channel with one or more devices. In examples, the NLU component may determine that the intent data corresponds to an intent to confirm event occurrence. For example, responses that include phrases such as "yes," "please help," "help." "call for help." "I've fallen," "call 911," etc. may be compared to intents designated as indicating event confirmation. The NLU component and/or another component of the remote system may generate confirmatory data indicating that the event has been confirmed to occur. The remote system may send a command to a notification component and/or a communications system to perform one or more action selected by a fusion component. For example, the notification component may receive an indication of the type of event that has been detected as well as which device detected the event and information associated with the device, the environment, and/or the user account associated with the device. The notification may include an indication that the event has been determined and, in examples, a request for input in response to the notification. Additionally, or alternatively, the communications system may receive the indication of the type of event that has been detected as well as which device detected the event and the information associated with the device, the environment, and/or the user account associated with the device. The communications system may identify the device identifier of the selected device utilized for NLU confirmation operations and/or another device associated with the user account. The communications system may also identify the device identifier of the other device that will have the communication channel established therewith. The other device may be selected based at least in part on the event type, the confidence at which event occurrence was confirmed, and/or user preferences. The other device may be associated with a family member, friend, and/or neighbor. In other examples, the other device may be associated with an emergency-services provider and/or system that may provide and/or send aid to a user in the environment.

FIG. 4 illustrates a flow diagram of an example process for device selection associated with event-detection confirmation systems. The order in which the operations or steps are described is not intended to be construed as a limitation, and any number of the described operations may be combined in any order and/or in parallel to implement process 400.

At block 402, the process 400 may include receiving sensor data from a first device. For example, a sensing device may generate sensor data utilizing, for example, dual-band radar functionality and the sensing device may send the sensor data to a remote system. The sensing device may include components such one or more antennas. The antennas may be configured to utilize dual-band radar functionality to receive data from within the environment. For example, the antennas may be configured to send and receive electromagnetic waves in radio and/or microwave domains. At least one of the antennas may be configured to send and receive electromagnetic waves having a bandwidth in the ultra-wide band range, such as a bandwidth at or around 60 GHz. At least one other of the antennas may be configured to send and receive electromagnetic waves having a bandwidth in the millimeter wave range, such as a bandwidth at or around 6 GHZ. The antennas may transmit the electromagnetic waves into the environment in which the sensing device is located and may receive the electromagnetic waves back at the sensing device. The distortion and/or change in the electromagnetic waves as received by the sensing device may indicate motion and/or a change in position of one or more objects within the environment. The electromagnetic waves may be received by the antennas, which may generate corresponding audio data.

At block 404, the process 400 may include determining a location of a predefined event within an environment in which the first device is situated. For example, when the sensor data includes data generated using radar, such as the dual-band radar technology disclosed herein that includes use of electromagnetic waves having a bandwidth in the ultra-wide band range and electromagnetic waves having a bandwidth in the millimeter wave range, the sensor data may indicate not only that an object is moving within the environment, but also the object's distance from the sensors and/or the angle of the object with respect to a plane of the sensors. Determining the distance may be based at least in part on a time-of-flight calculation performed by the sensing device and/or the remote system. The time-of-flight calculation may correlate an amount of time for electromagnetic waves emitted by the antenna(s) to return to the antenna(s), with longer amounts of time correlated to longer distances. Directionality of the object may also be determined utilizing, for example, triangulation data when multiple sensors are utilized and/or time-of-flight calculation.

At block 406, the process 400 may include determining a device identifier associated with the first device. For example, when the sensor data is sent from the first device and/or when event data is sent from the first device, associated metadata may also be sent. The metadata may indicate that the sensor data and/or the event data is being sent from a device with a given device identifier. In other examples, the sensor data and/or the event data may be sent from the first device to a voice-enabled device, which may send the metadata indicating the device that generated the sensor data.

At block 408, the process 400 may include determining whether one or more other devices are associated with the device identifier for the first device. For example, a user account stored in association with a user registry may include an indication that the device identifier for the first device is associated with the user account. The user account may also indicate one or more device identifiers of one or more other devices associated with the user account. The user account may also store data indicating which of the other devices include functionality for performing event-confirmation operations. That functionality may include, for example, AED components, a microphone, and/or a speaker.

If no other devices are associated with the device identifier, the process 400 may proceed to block 410 where the first device may be selected for event-confirmation operations. This example illustrates a situation where the first device includes voice-enabled functionality and is configured to receive audio, generate audio data, and send and receive audio data and commands from a remote system.

If one or more other devices are associated with the device identifier, the process 400 may proceed to block 412 where the system may determine whether the first device is closest to the location of the event. In examples, the information stored in association with the user account may include an indication of a distance between a given device, such as the voice-enabled device, and the first device, a room designation associated with a given device, and/or whether a given device includes a microphone and/or a speaker. A device-selection component may utilize this information and, in examples, data indicating a location of the predefined event, to determine which device to utilize for event-confirmation operations.

In examples where the first device is closest to the location and/or when the first device includes a microphone and a speaker, the process 400 may proceed to block 410 where the first device may be selected for event-confirmation operations. In these examples, it may be determined that the first device is situated to provide an optimal ability to receive audio data and output audio representing a request to confirm event occurrence.

In examples where the first device is not closest to the location, or in other words when one or more of the other devices is closer to the location, the process 400 may proceed to block 414 where the system may select the closest device and/or one of the devices closer to the location than the first device for event-confirmation operations. In still other examples, multiple devices may be selected and/or utilized to perform the event-confirmation operations and/or portions thereof. For example, multiple voice-enabled devices may be configured to receive audio, generate audio data, and perform AED analysis of the audio data. The results of the AED analysis of some or each of the multiple devices may be aggregated or otherwise utilized to determine whether to confirm that the event occurred.

Figure 5:
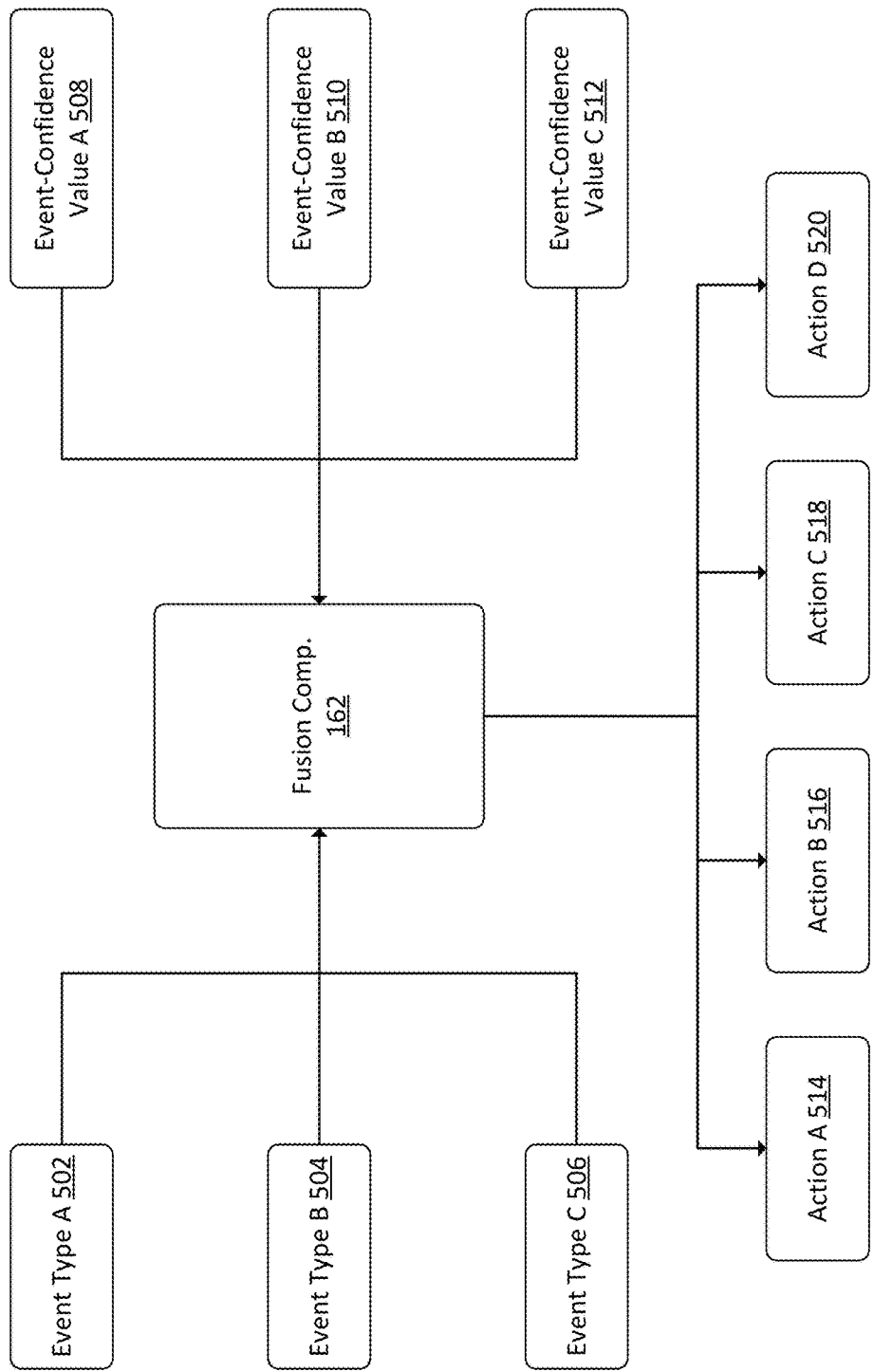
FIG. 5 illustrates example components and information utilized and generated in association with event-detection confirmation systems.

FIG. 5 illustrates example components and information utilized and generated in association with event-detection confirmation systems.

For example, one or more event types, such as Event Types A-C 502-506 may be associated with predefined events being monitored or otherwise checked for by the systems described herein. While the events may be any detectable event, by way of illustration with respect to FIG. 5, Event Type A 502 may correspond to a "fall" event: Event Type B 504 may correspond to a "presence-detection" event: and Event Type C 506 may correspond to a "breath-pattern" event. Each of these events may be associated with a motion pattern indicative of the event occurring. For example, Event Type A 502 may be associated with a motion pattern of a quick motion from a standing position to a position near or on the floor. Event Type A 502 may also correspond to a slumping motion, such as in a chair. By way of additional example, Event Type B 504 may be associated with the detection of motion with a movement pattern of walking from outside of the environment in question to within the environment in question. By way of additional example, Event Type C 506 may be associated with a repetitive, small movement pattern of at least a portion of an object. Event Type C 506 may also be associated with a movement pattern suggesting that a repetitive motion corresponding to a heartbeat has stopped or slowed below a certain number of beats per minute.

An event-detection component may be configured to receive sensor data and determine whether an event has occurred, as described more fully elsewhere herein. The event-detection component may also be configured to determine the event type of the event based at least in part on the sensor data and the motion pattern determined utilizing the sensor data. The indication that an event has occurred and an indication of the event type may be sent from the event-detection component to a fusion component 162.

In addition, one or more event-confidence values, such as Event-Confidence Values A-C 508-512, may be identified, determined, and/or generated. For example, the event-detection component may determine a confidence value, such as Event-Confidence Value A 508, associated with detecting occurrence of the event. Additionally, or alternatively, an AED component utilized for performing event-confirmation operations may determine a confidence value, such as Event-Confidence Value B 510, associated with determining that an audio fingerprint of audio from the environment corresponds to a reference audio fingerprint designated as corresponding to the event. Additionally, or alternatively, an NLU component utilized for performing event-confirmation operations may determine a confidence value, such as Event-Confidence Value C 512, associated with determining that a response to a user request for information indicates confirmation of event occurrence. The event-confidence values may be sent to the fusion component 162.

The fusion component 162 may utilize some or all of the information described with respect to FIG. 5 to determine whether to confirm that the predefined event occurred, whether to perform additional event-confirmation operations, and/or whether to take one or more actions in response to the predefined event. For example, the fusion component 162 may determine that an action is to be taken without event-confirmation operations when a confidence value associated with the indication that the predefined event occurred is greater than a threshold confidence. In other examples, the fusion component 162 may determine that confirmation operations are to be performed utilizing the AED component, as described herein. In still other examples, the fusion component 162 may determine that confirmation operations are to be performed utilizing the NLU component, as described herein. When the confirmatory data from the AED component indicates that the audio fingerprint corresponds to the reference audio fingerprint at below a given threshold confidence, the fusion component 162 may determine that NLU confirmation operations should be initiated. In other examples when NLU is utilized prior to AED, when the confirmatory data indicates that no response was provided by a user in the environment and/or when the response does not indicate confirmation of the event occurring, such as above a threshold confidence, the fusion component 162 may determine that AED confirmation operations should be initiated.

Additionally, or alternatively, the fusion component 162 may receive additional inputs from the sensing device, the voice-enabled device, and/or another device and may utilize those inputs for confirming whether the predefined event occurred. For example, inputs such as accelerometer data from the sensors of the personal device associated with the user may be received and utilized to confirm whether the event occurred and/or to send notifications to. The inputs may also include image data in examples where a device, such as the personal device, located in the environment includes a camera. In these examples, computer vision techniques may be utilized to identify objects represented in the image data as well as information associated with the objects, such as posture, color, movement, etc. Additional inputs may include beacon data from the personal device associated with a user. The beacon data may indicate that the personal device is located in the environment. In still other examples, the personal device may be caused to vibrate and/or display a request for user input to confirm or refute that the predefined event has occurred. Input data indicating the user has selected to confirm event occurrence may be utilized by the fusion component 162.

The fusion component 162 may also utilize the indication of the event and/or the confirmatory data to determine whether an action is to be performed. For example, the fusion component 162 may confirm that the predefined event occurred and may cause one or more components of the remote system to perform one or more actions, such as Actions A-D 514-520. The actions may include, for example, Action A 514, which may correspond to sending a notification of event occurrence to a designated device, such as the sensing device, the voice-enabled device, and/or another device. The action may also include, for example, Action B 516, which may correspond to causing a communication channel to be established between the selected device and the other device designated for contact when the event occurs. The action may also include, for example, Action C 518, which may correspond to sending a notification and/or establishing a communication channel with an emergency service provider system. The action may also include, for example, Action D 520, which may correspond to causing an alarm to activate. Additional and/or different actions may be taken and may be selected based at least in part on the event type at issue and/or the confidence value associated with confirming that the event occurred.

Figure 7:
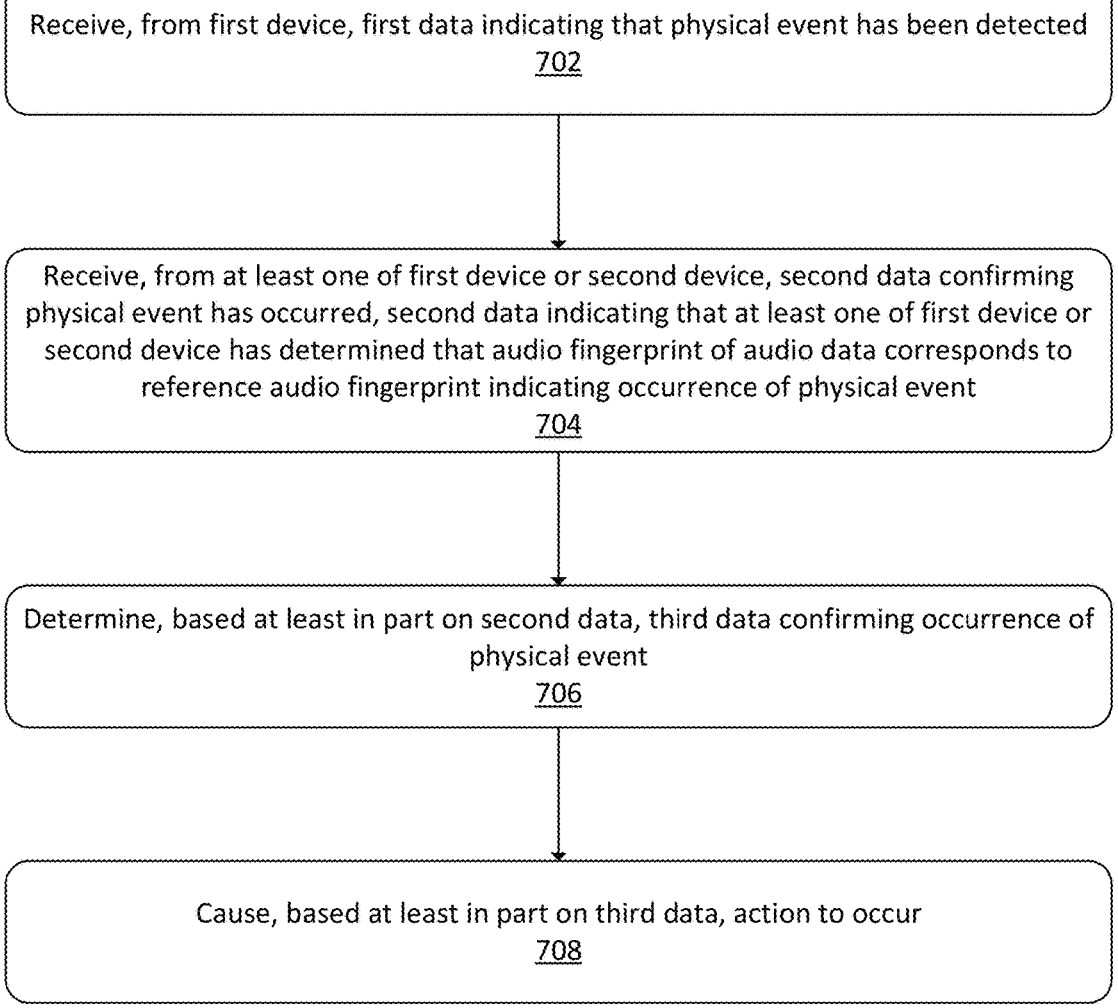
FIG. 7 illustrates a flow diagram of another example process for event-detection confirmation.
Figure 8:
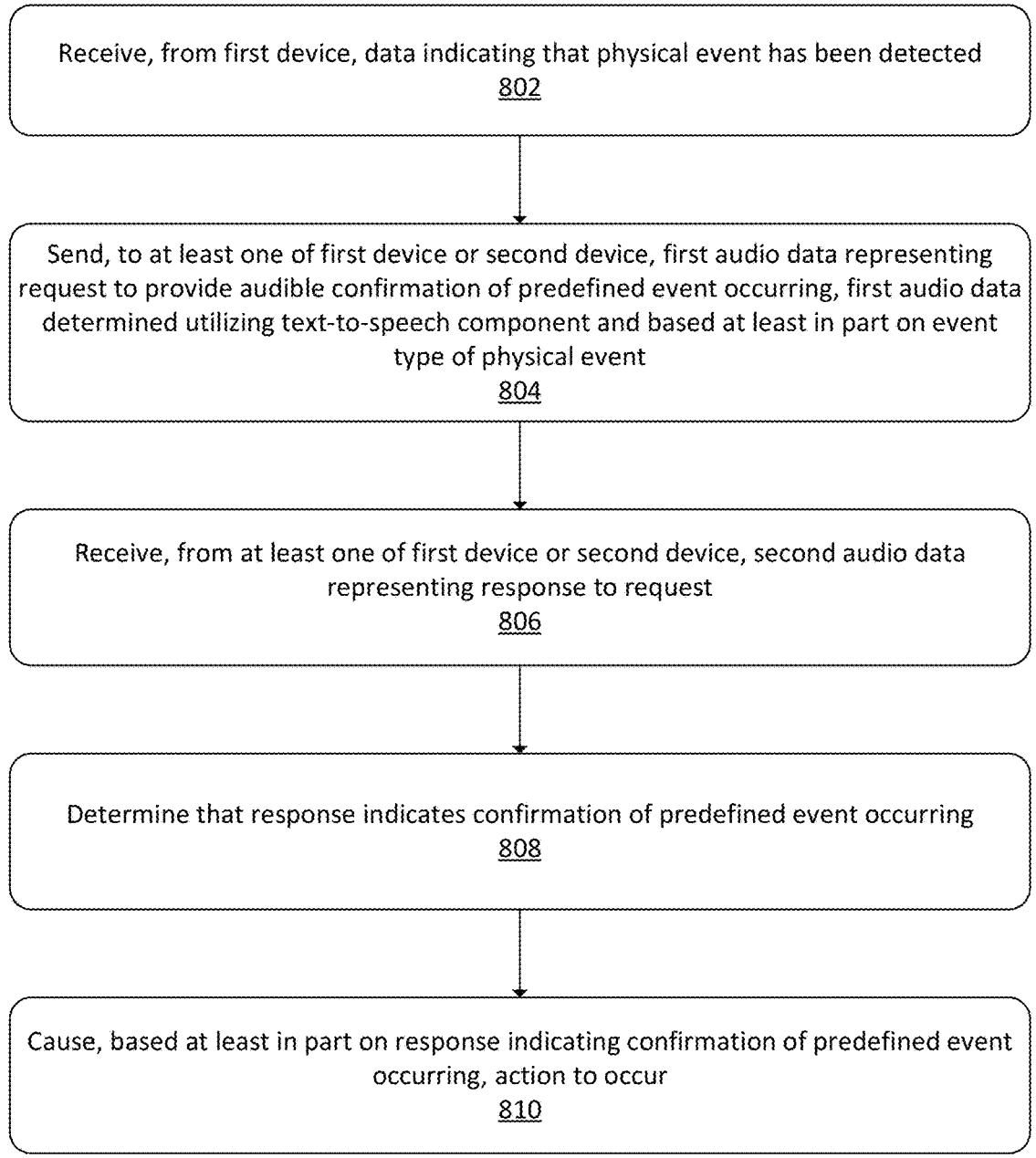
FIG. 8 illustrates a flow diagram of another example process for event-detection confirmation.

FIGS. 6-8 illustrate processes for event-detection confirmation. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, 5, and 9-11, although the processes may be implemented in a wide variety of other environments, architectures and systems.

FIG. 6 illustrates a flow diagram of an example process for event-detection confirmation. The order in which the operations or steps are described is not intended to be construed as a limitation, and any number of the described operations may be combined in any order and/or in parallel to implement process 600.

At block 602, the process 600 may include receiving, from a first device having radar functionality, first data indicating that a physical event has been detected utilizing the radar functionality. For example, a sensing device may generate sensor data utilizing, for example, dual-band radar functionality and the sensing device may send the sensor data to a remote system. The sensing device may include components such one or more antennas. The antennas may be configured to utilize dual-band radar functionality to receive data from within the environment. For example, the antennas may be configured to send and receive electromagnetic waves in radio and/or microwave domains. At least one of the antennas may be configured to send and receive electromagnetic waves having a bandwidth in the ultra-wide band range, such as a bandwidth at or around 60 GHZ. At least one other of the antennas may be configured to send and receive electromagnetic waves having a bandwidth in the millimeter wave range, such as a bandwidth at or around 6 GHZ. The antennas may transmit the electromagnetic waves into the environment in which the sensing device is located and may receive the electromagnetic waves back at the sensing device. The distortion and/or change in the electromagnetic waves as received by the sensing device may indicate motion and/or a change in position of one or more objects within the environment. The electromagnetic waves may be received by the antennas, which may generate corresponding audio data.

The audio data may be sent to an event-detection component, which may determine whether one or more predefined events has occurred based at least in part on the audio data. For example, one or more models may be configured to receive the audio data as input and determine if one or more characteristics associated with the audio data correspond to reference audio data associated with the predefined event(s). When the event-detection component determines that the audio data corresponds to the reference audio data, such as above a threshold confidence, the event-detection component may identify, determine, and/or generate event data, described with respect to this figure as first data, indicating that the predefined event has occurred.

At block 604, the process 600 may include receiving, from a second device that includes a microphone and a speaker, second data that confirms the physical event has occurred, the second data indicating that an acoustic-event detection component of the second device has determined that an audio fingerprint of first audio data corresponds to a reference audio fingerprint indicating a sound designated as confirming occurrence of the physical event. For example, a remote system may send one or more commands and/or data to an AED component to perform one or more operations associated with event-confirmation. The data may represent instructions and/or commands for the voice-enabled device to perform one or more operations. Those operations may include, in examples, causing the microphone of the voice-enabled device to capture audio from the environment and send corresponding audio data to the remote system for AED analysis. In other examples, the microphone of the voice-enabled device may already be configured to capture audio, and in these examples, the operations may include causing the voice-enabled device to send the generated audio data to the remote system for AED analysis. In still other examples, AED may be performed by the voice-enabled device 102 in addition to and/or instead of by the remote system. In these examples the operations may include causing the AED component to be enabled or otherwise turned on, or the operations may include causing the AED component to transition from a first mode to a second mode representing a higher sensitivity to audio data generated by the microphone. The microphone may capture audio from within the environment and generate corresponding audio data.

The AED component may utilize the audio data generated by the microphone to determine if an audio fingerprint of the audio data, or portion thereof, corresponds to a reference audio fingerprint associated with the predefined event. For example, the one or more predefined events may be associated with one or more reference audio fingerprints characteristic of sound made when the event occurs. For example, the sound of a human body hitting a floor in the event of a fall may have a given audio fingerprint, a person expressing pain and/or disorientation may have another audio fingerprint, glass breaking may have yet another audio fingerprint, etc. The AED component may receive an indication, such as from the event-detection component, of the type of predefined event that has been detected and may utilize reference audio fingerprints associated with that event type for analysis in association with the audio fingerprint in question. It should be understood that in given examples the remote system may cause the sensing device to perform the confirmation operations described herein. In other examples, the remote system may cause one or more other selected devices, such as the voice-enabled device, to perform the confirmation operations described herein. In still other examples, the remote system may communicate with the sensing device, which may then communicate with another device to perform the confirmation operations.

At block 606, the process 600 may include receiving, from the second device, second audio data representing a response to a request to provide audible confirmation of the physical event occurring. For example, based at least in part on the confirmatory data from the AED component and/or a confidence value associated with the confirmatory data and/or the event data, the remote system may send one or more commands and/or data to a NLU component to perform one or more operations associated with event-confirmation. A TTS component may generate audio data representing a request for audible confirmation that the predefined event has occurred. For example, the request may be "A fall has been detected. Are you okay?" The audio data may be sent from the remote system to the selected device, such as the voice-enabled device, which may cause the voice-enabled device to output audio representing the request via the speaker. The user and/or another user in the environment may provide an audible response to the request. The response may confirm or refute that the predefined event occurred. For example, when the request includes "Are you okay?" a response of "no" may indicate that the predefined event occurred while a response of "yes" may indicate that the predefined event did not occur. Audio representing the response may be captured by the microphone of the voice-enabled device and the corresponding audio data may be sent to the remote system.

At block 608, the process 600 may include determining, utilizing natural language understanding processing, that the response indicates confirmation of the physical event occurring. For example, the audio data may be sent to the remote system for speech processing, which may include generating, utilizing an ASR component, text data corresponding to the audio data. The text data may be utilized by the NLU component to determine intent data representing the response. It should be understood the while the voice-enabled device is described as outputting audio representing the request and receiving audio representing the response, these operations may be performed by one or more other devices, such as the sensing device and/or a personal device.

At block 610, the process 600 may include causing, from at least one of the second data or determining that the response indicates confirmation of the physical event occurring, a communication channel to be established between the second device and the third device. For example, if the response indicates that the event occurred and/or if no response was received, the system may send a notification to one or more devices and/or establish a communication channel with one or more devices. In examples, the NLU component may determine that the intent data corresponds to an intent to confirm event occurrence. For example, responses that include phrases such as "yes." "please help," "help." "call for help," "I've fallen," "call 911," etc. may be compared to intents designated as indicating event confirmation. The NLU component and/or another component of the remote system may generate confirmatory data indicating that the event has been confirmed to occur. The remote system may send a command to a notification component and/or a communications system to perform one or more action selected by a fusion component. For example, the notification component may receive an indication of the type of event that has been detected as well as which device detected the event and information associated with the device, the environment, and/or the user account associated with the device. The notification may include an indication that the event has been determined and, in examples, a request for input in response to the notification. Additionally, or alternatively, the communications system may receive the indication of the type of event that has been detected as well as which device detected the event and the information associated with the device, the environment, and/or the user account associated with the device. The communications system may identify the device identifier of the selected device utilized for NLU confirmation operations and/or another device associated with the user account. The communications system may also identify the device identifier of the other device that will have the communication channel established therewith. The other device may be selected based at least in part on the event type, the confidence at which event occurrence was confirmed, and/or user preferences. The other device may be associated with a family member, friend, and/or neighbor. In other examples, the other device may be associated with an emergency-services provider and/or system that may provide and/or send aid to a user in the environment.

Additionally, or alternatively, the process 600 may include generating a model configured to receive, as inputs: the first data indicating that the physical event has occurred; the second data indicating that the audio fingerprint corresponds to the reference audio fingerprint: and third data indicating that the response confirms occurrence of the predefined event. The process 600 may also include determining, utilizing the model and the first data, a first confidence value indicating at least a first threshold confidence that the physical event occurred, wherein receiving the second data is in response to the first confidence value indicating the at least the first threshold confidence. The process 600 may also include determining, utilizing the model and the second data, a second confidence value indicating at least a second threshold confidence that the physical event occurred, wherein receiving the second audio data is in response to the second confidence value indicating the at least the second threshold confidence. The process 600 may also include determining, utilizing the model and the third data, a third confidence value indicating at least a third threshold confidence that the physical event occurred, wherein causing the communication channel to be established is in response to the third threshold value indicating the at least the third threshold confidence.

Additionally, or alternatively, the process 600 may include receiving an indication of a location, within an environment including the first device, of the physical event and determining an account identifier associated with the first device. The process 600 may also include identifying voice-enabled devices associated with the account identifier, the voice-enabled devices including the second device. The process 600 may also include determining that the second device is a closest device of the voice-enabled devices to the location. The process 600 may also include selecting the second device to receive the second data from.

Additionally, or alternatively, the process 600 may include determining that at least one of the first device or the second device has detected at least one of sound or an infrared signature of a living object. The process 600 may also include causing, from receiving the indication, the radar functionality to activate.

Additionally, or alternatively, the process 600 may include determining a confidence value that the predefined event occurred, the confidence value determined from the first data, the second data, and third data indicating that the response confirms occurrence of the predefined event. The process 600 may also include determining that the confidence value indicates greater confidence than a first threshold confidence and lesser confidence than a second threshold confidence. In these examples, causing an alert to be sent may be in response to the confidence value indicating greater confidence than the first threshold confidence and lesser confidence than the second threshold confidence. The process 600 may also include determining that the confidence value indicates greater confidence than the second threshold confidence. In these examples causing the communication channel to be established may be in response to the confidence value indicating greater confidence than the second threshold confidence.

FIG. 7 illustrates a flow diagram of another example process for event-detection confirmation. The order in which the operations or steps are described is not intended to be construed as a limitation, and any number of the described operations may be combined in any order and/or in parallel to implement process 700.

At block 702, the process 700 may include receiving, from a first device, first data indicating that a physical event has been detected. For example, a sensing device may generate sensor data utilizing, for example, dual-band radar functionality and the sensing device may send the sensor data to a remote system. The sensing device may include components such one or more antennas. The antennas may be configured to utilize dual-band radar functionality to receive data from within the environment. For example, the antennas may be configured to send and receive electromagnetic waves in radio and/or microwave domains. At least one of the antennas may be configured to send and receive electromagnetic waves having a bandwidth in the ultra-wide band range, such as a bandwidth at or around 60 GHZ. At least one other of the antennas may be configured to send and receive electromagnetic waves having a bandwidth in the millimeter wave range, such as a bandwidth at or around 6 GHZ. The antennas may transmit the electromagnetic waves into the environment in which the sensing device is located and may receive the electromagnetic waves back at the sensing device. The distortion and/or change in the electromagnetic waves as received by the sensing device may indicate motion and/or a change in position of one or more objects within the environment. The electromagnetic waves may be received by the antennas, which may generate corresponding audio data.

The audio data may be sent to an event-detection component, which may determine whether one or more predefined events has occurred based at least in part on the audio data. For example, one or more models may be configured to receive the audio data as input and determine if one or more characteristics associated with the audio data correspond to reference audio data associated with the predefined event(s). When the event-detection component determines that the audio data corresponds to the reference audio data, such as above a threshold confidence, the event-detection component may identify, determine, and/or generate event data, described with respect to this figure as first data, indicating that the predefined event has occurred.

At block 704, the process 700 may include receiving, from at least one of the first device or a second device, second data confirming the physical event has occurred, the second data indicating that the at least one of the first device or the second device has determined that an audio fingerprint of audio data corresponds to a reference audio fingerprint indicating occurrence of the physical event. For example, a remote system may send one or more commands and/or data to an AED component to perform one or more operations associated with event-confirmation. The data may represent instructions and/or commands for the voice-enabled device to perform one or more operations. Those operations may include, in examples, causing the microphone of the voice-enabled device to capture audio from the environment and send corresponding audio data to the remote system for AED analysis. In other examples, the microphone of the voice-enabled device may already be configured to capture audio, and in these examples, the operations may include causing the voice-enabled device to send the generated audio data to the remote system for AED analysis. In still other examples, AED may be performed by the voice-enabled device in addition to and/or instead of by the remote system. In these examples the operations may include causing the AED component to be enabled or otherwise turned on, or the operations may include causing the AED component to transition from a first mode to a second mode representing a higher sensitivity to audio data generated by the microphone. The microphone may capture audio from within the environment and generate corresponding audio data.

The AED component may utilize the audio data generated by the microphone to determine if an audio fingerprint of the audio data, or portion thereof, corresponds to a reference audio fingerprint associated with the predefined event. For example, the one or more predefined events may be associated with one or more reference audio fingerprints characteristic of sound made when the event occurs. For example, the sound of a human body hitting a floor in the event of a fall may have a given audio fingerprint, a person expressing pain and/or disorientation may have another audio fingerprint, glass breaking may have yet another audio fingerprint, etc. The AED component may receive an indication, such as from the event-detection component, of the type of predefined event that has been detected and may utilize reference audio fingerprints associated with that event type for analysis in association with the audio fingerprint in question.

At block 706, the process 700 may include determining, based at least in part on the second data, third data confirming occurrence of the physical event. For example, the third data may represent confirmatory data that the AED component has determined that the audio fingerprint corresponds to at least one reference audio fingerprint.

At block 708, the process 700 may include causing, based at least in part on the third data, an action to occur. For example, the remote system may send a command to a notification component and/or a communications system to perform one or more action selected by a fusion component. For example, the notification component may receive an indication of the type of event that has been detected as well as which device detected the event and information associated with the device, the environment, and/or the user account associated with the device. The notification may include an indication that the event has been determined and, in examples, a request for input in response to the notification. Additionally, or alternatively, the communications system may receive the indication of the type of event that has been detected as well as which device detected the event and the information associated with the device, the environment, and/or the user account associated with the device. The communications system may also identify the device identifier of the other device that will have the communication channel established therewith. The other device may be selected based at least in part on the event type, the confidence at which event occurrence was confirmed, and/or user preferences. The other device may be associated with a family member, friend, and/or neighbor. In other examples, the other device may be associated with an emergency-services provider and/or system that may provide and/or send aid to a user in the environment.

Additionally, or alternatively, the process 700 may include determining, based at least in part on the first data, a first confidence value indicating at least a first threshold confidence that the physical event occurred, wherein receiving the second data comprises receiving the second data based at least in part on the first confidence value indicating the at least the first threshold confidence. The process 700 may also include determining, based at least in part on the third data, a second confidence value indicating at least a second threshold confidence that the physical event occurred, wherein causing the action to occur comprises causing the action to occur based at least in part on the second threshold value indicating the at least the second threshold confidence.

Additionally, or alternatively, the process 700 may include receiving an indication of a location of the physical event and determining an account identifier associated with the first device. The process 700 may also include identifying voice-enabled devices associated with the account identifier, the voice-enabled devices including the second device. The process 700 may also include determining that the second device is closer to the location than the first device. The process 700 may also include selecting the second device to receive the second data from. In these examples, receiving the second data may be based at least in part on selecting the second device.

Additionally, or alternatively, the process 700 may include determining a confidence value that the physical event occurred, the confidence value based at least in part on at least one of the first data or the third data. The process 700 may also include determining that the confidence value satisfies a first threshold confidence. In these examples, causing the first action to occur comprises causing the first action to occur based at least in part on the confidence value satisfying the first threshold confidence. The process 700 may also include determining that the confidence value satisfies a second threshold confidence and causing a second action to occur based at least in part on the confidence value satisfying the second threshold confidence.

Additionally, or alternatively, the process 700 may include determining that at least one of the first device or the second device has detected at least one of sound or an infrared signature of a living object. The process 700 may also include causing, from receiving the indication, radar functionality of the first device to activate.

Additionally, or alternatively, the process 700 may include sending, to the at least one of the first device or the second device, second audio data representing a request to provide audible confirmation of the physical event occurring, the second audio data determined utilizing a text-to-speech component and based at least in part on an event type of the physical event. The process 700 may also include receiving, from the at least one of the first device or the second device, third audio data representing a response to the request. The process 700 may also include determining that the response indicates confirmation of the physical event occurring. In these examples, causing the action to occur may include causing the action to occur based at least in part on the response indicating confirmation of the physical event occurring.

Additionally, or alternatively, the process 700 may include storing first reference audio fingerprints associated with a first event type and second reference audio fingerprints associated with a second event type. The process 700 may also include determining that the physical event is associated with the first event type. The process 700 may also include causing the at least one of the first device or the second device to analyze the audio fingerprint in association with the first reference audio fingerprints based at least in part on determining that the physical event is associated with the first event type.

FIG. 8 illustrates a flow diagram of another example process for event-detection confirmation. The order in which the operations or steps are described is not intended to be construed as a limitation, and any number of the described operations may be combined in any order and/or in parallel to implement process 800.

At block 802, the process 800 may include receiving, from a first device, data indicating that a physical event has been detected. For example, a sensing device may generate sensor data utilizing, for example, dual-band radar functionality and the sensing device may send the sensor data to a remote system. The sensing device may include components such one or more antennas. The antennas may be configured to utilize dual-band radar functionality to receive data from within the environment. For example, the antennas may be configured to send and receive electromagnetic waves in radio and/or microwave domains. At least one of the antennas may be configured to send and receive electromagnetic waves having a bandwidth in the ultra-wide band range, such as a bandwidth at or around 60 GHz. At least one other of the antennas may be configured to send and receive electromagnetic waves having a bandwidth in the millimeter wave range, such as a bandwidth at or around 6 GHZ. The antennas may transmit the electromagnetic waves into the environment in which the sensing device is located and may receive the electromagnetic waves back at the sensing device. The distortion and/or change in the electromagnetic waves as received by the sensing device may indicate motion and/or a change in position of one or more objects within the environment. The electromagnetic waves may be received by the antennas, which may generate corresponding audio data.

The audio data may be sent to an event-detection component, which may determine whether one or more predefined events has occurred based at least in part on the audio data. For example, one or more models may be configured to receive the audio data as input and determine if one or more characteristics associated with the audio data correspond to reference audio data associated with the predefined event(s). When the event-detection component determines that the audio data corresponds to the reference audio data, such as above a threshold confidence, the event-detection component may identify, determine, and/or generate event data, described with respect to this figure as first data, indicating that the predefined event has occurred.

At block 804, the process 800 may include sending, to at least one of the first device or a second device, first audio data representing a request to provide audible confirmation of the predefined event occurring, the first audio data determined utilizing a text-to-speech component and based at least in part on an event type of the physical event. For example, the remote system may send one or more commands and/or data to a NLU component to perform one or more operations associated with event-confirmation. A TTS component may generate audio data representing a request for audible confirmation that the predefined event has occurred. For example, the request may be "A fall has been detected. Are you okay?" The audio data may be sent from the remote system to the selected device, such as the voice-enabled device, which may cause the voice-enabled device to output audio representing the request via the speaker.

At block 806, the process 800 may include receiving, from the at least one of the first device or the second device, second audio data representing a response to the request. For example, the user and/or another user in the environment may provide an audible response to the request. The response may confirm or refute that the predefined event occurred. For example, when the request includes "Are you okay?" a response of "no" may indicate that the predefined event occurred while a response of "yes" may indicate that the predefined event did not occur. Audio representing the response may be captured by the microphone of the voice-enabled device and the corresponding audio data may be sent to the remote system.

At block 808, the process 800 may include determining that the response indicates confirmation of the predefined event occurring. For example, the audio data may be sent to the remote system for speech processing, which may include generating, utilizing an ASR component, text data corresponding to the audio data. The text data may be utilized by the NLU component to determine intent data representing the response. It should be understood the while the voice-enabled device is described as outputting audio representing the request and receiving audio representing the response, these operations may be performed by one or more other devices, such as the sensing device and/or a personal device.

At block 810, the process 800 may include causing, based at least in part on the response indicating confirmation of the predefined event occurring, an action to occur. For example, if the response indicates that the event occurred and/or if no response was received, the system may send a notification to one or more devices and/or establish a communication channel with one or more devices. In examples, the NLU component may determine that the intent data corresponds to an intent to confirm event occurrence. For example, responses that include phrases such as "yes," "please help," "help." "call for help." "I've fallen," "call 911," etc. may be compared to intents designated as indicating event confir-mation. The NLU component and/or another component of the remote system may generate confirmatory data indicating that the event has been confirmed to occur. The remote system may send a command to a notification component and/or a communications system to perform one or more action selected by a fusion component. For example, the notification component may receive an indication of the type of event that has been detected as well as which device detected the event and information associated with the device, the environment, and/or the user account associated with the device. The notification may include an indication that the event has been determined and, in examples, a request for input in response to the notification. Additionally, or alternatively, the communications system may receive the indication of the type of event that has been detected as well as which device detected the event and the information associated with the device, the environment, and/or the user account associated with the device. The communications system may identify the device identifier of the selected device utilized for NLU confirmation operations and/or another device associated with the user account. The communications system may also identify the device identifier of the other device that will have the communication channel established therewith. The other device may be selected based at least in part on the event type, the confidence at which event occurrence was confirmed, and/or user preferences. The other device may be associated with a family member, friend, and/or neighbor. In other examples, the other device may be associated with an emergency-services provider and/or system that may provide and/or send aid to a user in the environment.

Additionally, or alternatively, the process 800 may include determining, based at least in part on the data, a first confidence value indicating at least a first threshold confidence that the predefined event occurred. In these examples, sending the first audio data comprises sending the first audio data based at least in part on the first confidence value indicating the at least the first threshold confidence. The process 800 may also include determining, based at least in part on an indication that the response indicates confirmation of the predefined event occurring, a second confidence value indicating at least a second threshold confidence that the predefined event occurred. In these examples, causing the action to occur comprises causing the action to occur based at least in part on the second threshold value indicating the at least the second threshold confidence.

Additionally, or alternatively, the process 800 may include receiving an indication of a location of the physical event and determining an account identifier associated with the first device. The process 800 may also include identifying voice-enabled devices associated with the account identifier, the voice-enabled devices including the second device. The process 800 may also include determining that the second device is closer to the location than the first device and sending the first audio data to the second device based at least in part on the second device being closer to the location than the first device.

Additionally, or alternatively, the process 800 may include determining a confidence value that the physical event occurred, the confidence value based at least in part on at least one of the data or an indication that the response confirms the predefined event occurring. The process 800 may also include determining that the confidence value satisfies a first threshold confidence. In these examples, causing the first action to occur comprises causing the first action to occur based at least in part on the confidence value satisfying the first threshold confidence and lesser confidence. The process 800 may also include determining that the confidence value satisfies a second threshold confidence and causing a second action to occur based at least in part on the confidence value satisfying the second threshold confidence.

Additionally, or alternatively, the process 800 may include determining that at least one of the first device or the second device has detected at least one of sound or an infrared signature of a living object. The process 800 may also include causing, from receiving the indication, radar functionality of the first device to activate.

Additionally, or alternatively, the process 800 may include receiving, from at least one of the first device or a second device, second data confirming the physical event has occurred, the second data indicating that the at least one of the first device or the second device has determined that an audio fingerprint of third audio data corresponds to a reference audio fingerprint indicating occurrence of the physical event. The process 800 may also include determining, based at least in part on the second data, third data confirming occurrence of the physical event. In these examples, causing the action to occur may be based at least in part on the third data.

Additionally, or alternatively, the process 800 may include storing first reference audio fingerprints associated with a first event type and second reference audio fingerprints associated with a second event type. The process 800 may also include determining that the physical event is associated with the first event type. The process 800 may also include causing the at least one of the first device or the second device to analyze the audio fingerprint in association with the first reference audio fingerprints based at least in part on determining that the physical event is associated with the first event type.

Figure 9:
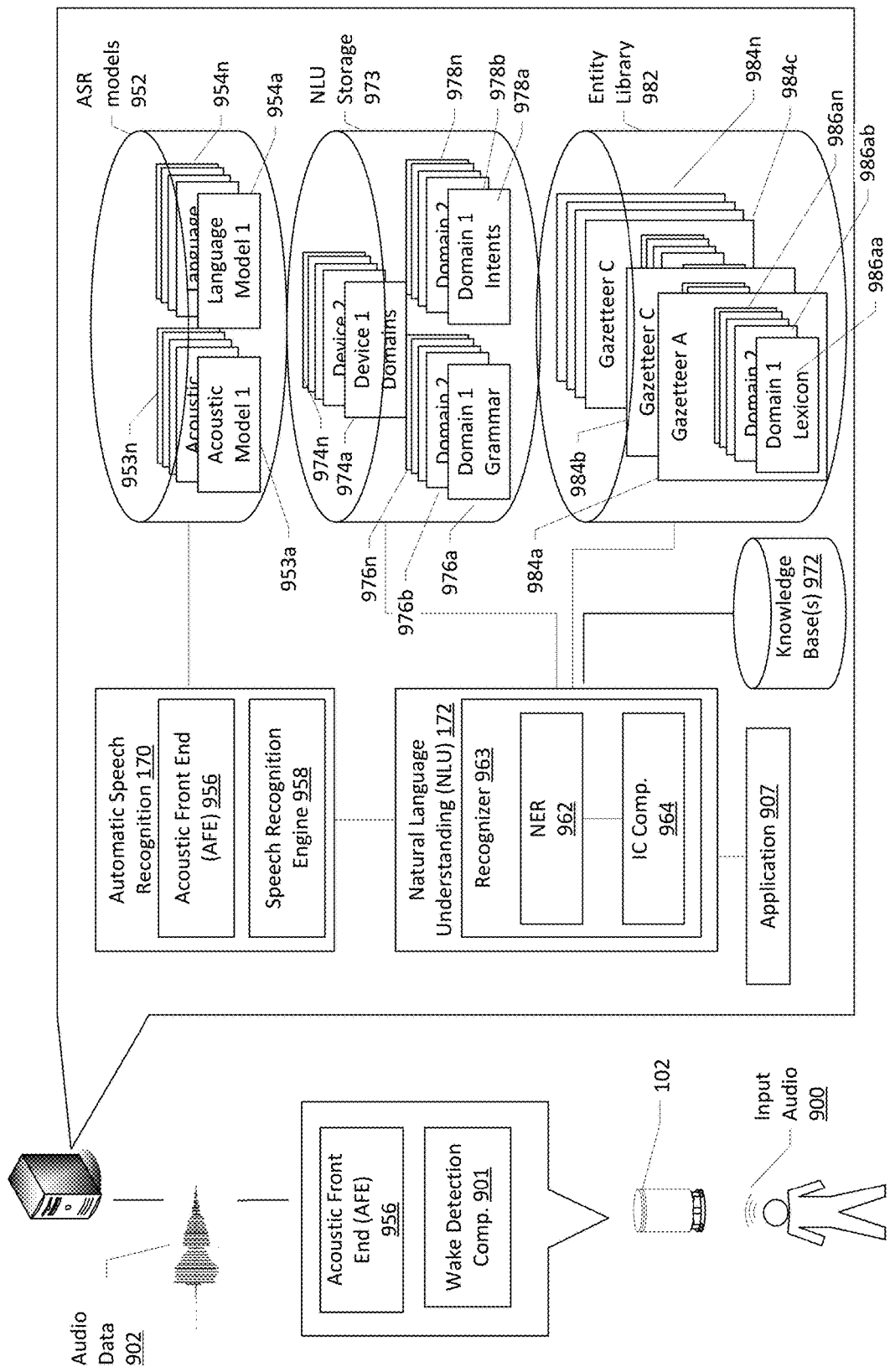
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 108). The various components illustrated may be located on a same device or different physical devices. Message between various components illustrated in FIG. 9 may occur directly or across a network 110. An audio capture component, such as a microphone 118 of the device 102, or another device, captures audio 900 corresponding to a spoken utterance. The device 102, using a wake-word component 901, then processes audio data corresponding to the audio 900 to determine if a keyword (such as a wakeword) is detected in the audio data. Following detection of a wakeword, the device 102 sends audio data 902 corresponding to the utterance to the remote system 108 that includes an ASR component 126. The audio data 902 may be output from an optional acoustic front end (AFE) 956 located on the device prior to transmission. In other instances, the audio data 902 may be in a different form for processing by a remote AFE 956, such as the AFE 956 located with the ASR component 170 of the remote system 108.

The wake-word component 901 works in conjunction with other components of the user device, for example a microphone to detect keywords in audio 900. For example, the device may convert audio 900 into audio data, and process the audio data with the wake-word component 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input: the energy levels of the audio input in one or more spectral bands: the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake-word component 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 902 corresponding to input audio 900 to the remote system 108 for speech processing. Audio data corresponding to that audio may be sent to remote system 108 for routing to a recipient device or may be sent to the remote system 108 for speech processing for interpretation of the included speech (either for purposes of enabling voice-messages and/or for purposes of executing a command in the speech). The audio data 902 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 108, an ASR component 170 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 170 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 108 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, call Rob?" The wake detection component may identify the wake word, otherwise described as a trigger expression, "Alexa," in the user utterance and may "wake" based on identifying the wake word. Audio data corresponding to the user utterance may be sent to the remote system 108, where the speech recognition engine 958 may identify, determine, and/or generate text data corresponding to the user utterance, here "call Rob."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 108, for natural language understanding (NLU) processing, such as conversion of the text into commands for execution, either by the user device, by the remote system 108, or by another device (such as a server running a specific application like a search engine, etc.).

The device performing NLU processing 172 (e.g., server 108) may include various components, including potentially dedicated processor(s), memory, storage, etc. As shown in FIG. 9, an NLU component 172 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 170 based on the utterance input audio 900) and attempts to make a semantic interpretation of the text. That is, the NLU process determines the meaning behind the text based on the individual words and then implements that meaning. NLU processing 172 interprets a text string to derive an intent or a desired action from the user as well as the pertinent pieces of information in the text that allow a device (e.g., device 102) to complete that action. For example, if a spoken utterance is processed using ASR 170 and outputs the text "call for help" the NLU process may determine that the user intended to establish a communication channel and/or send a notification to a device for emergency services.

The NLU may process several textual inputs related to the same utterance. For example, if the ASR 170 outputs N text segments (as part of an N-best list), the NLU may process all N outputs to obtain NLU results.

As will be discussed further below, the NLU process may be configured to parse and tag to annotate text as part of NLU processing. For example, for the text "call Rob," "call" may be tagged as a command (to identify the title of a song) and "Rob" may be tagged as the naming identifier of the device to be called.

To correctly perform NLU processing of speech input, an NLU process 172 may be configured to determine a "domain" of the utterance so as to determine and narrow down which services offered by the endpoint device (e.g., remote system 108 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 172 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "call" is an identified intent, a grammar (976) framework or frameworks may correspond to sentence structures such as "call device with {Rob} identifier."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song." meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an application 907. The destination application 907 may be determined based on the NLU output. For example, if the NLU output includes a command to send a message, the destination application 907 may be a message sending application, such as one located on the user device or in a message sending appliance, configured to execute a message sending command. If the NLU output includes a search request, the destination application 907 may include a search engine processor, such as one located on a search server, configured to execute a search command. After the appropriate command is generated based on the intent of the user, the application 907 may provide some or all of this information to a text-to-speech (TTS) engine. The TTS engine may then generate an actual audio file for outputting the audio data determined by the application 907 (e.g., "okay," or "connecting you to local authorities"). After generating the file (or "audio data"), the TTS engine may provide this data back to the remote system 108.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 172 during runtime operations where NLU operations are performed on text (such as text output from an ASR component 170). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 108 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 108, as illustrated herein are exemplary, and may be located in a stand-alone device or may be included, in whole or in part, as a component of a larger device or system, may be distributed across a network or multiple devices connected by a network, etc.

Figure 10:
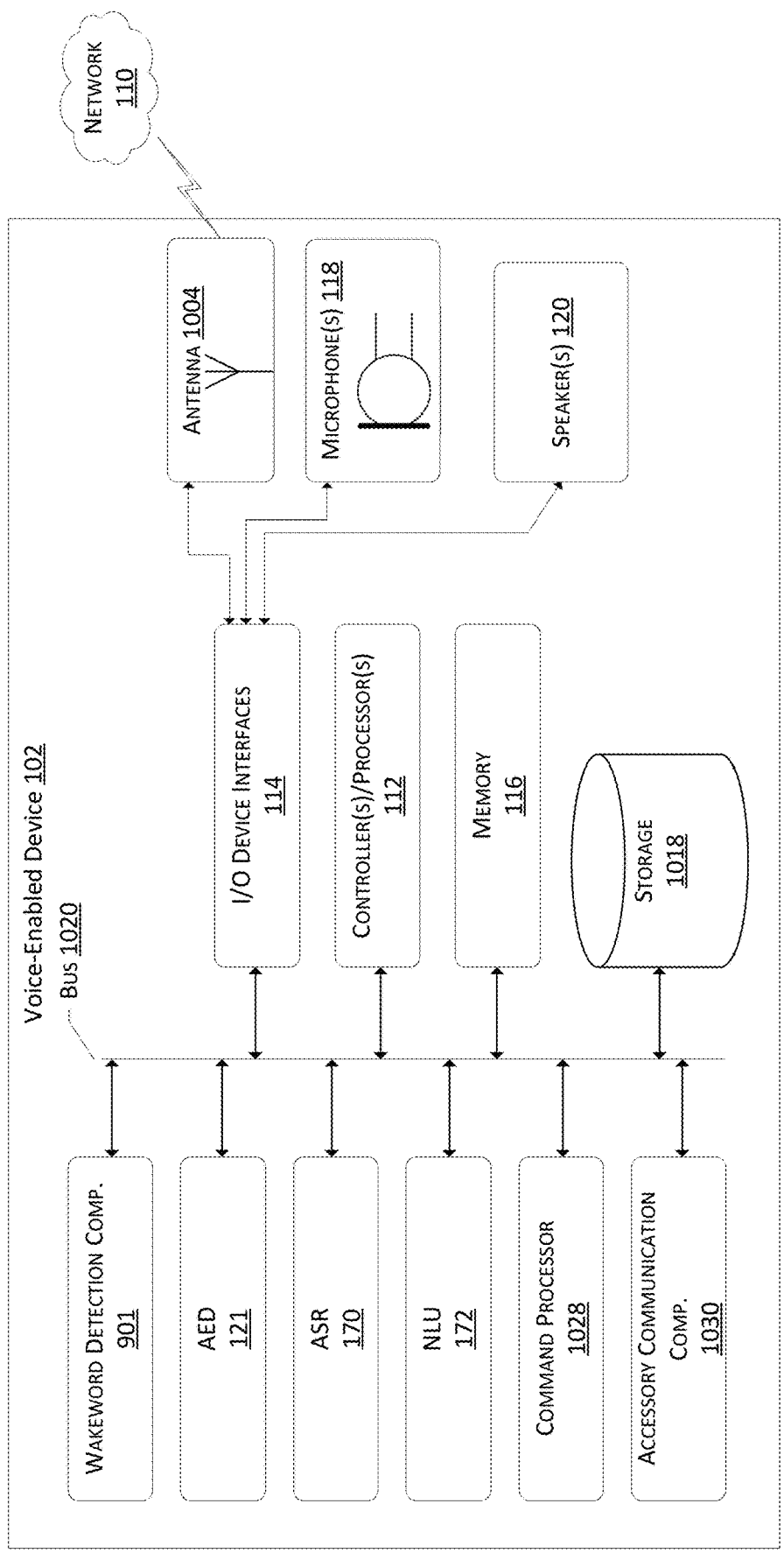
FIG. 10 illustrates a conceptual diagram of example components of a voice-enabled device that may be utilized in association with event-detection confirmation systems.

FIG. 10 illustrates a conceptual diagram of example components of a voice-enabled device that may be utilized in association with event-detection confirmation systems. The voice-enabled device 102 may be implemented as a standalone device 102 that is relatively simple in terms of functional capabilities with limited input/output components, memory, and processing capabilities. For instance, the voice-enabled device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the voice-controlled device 102. Nonetheless, the primary, and potentially only mode, of user interaction with the device 102 is through voice input and audible output. In some instances, the device 102 may simply comprise a microphone 118, a power source, and functionality for sending generated audio data via one or more antennas 1004 to another device.

The voice-enabled device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the voice-controlled device 102 may also include configurations as a personal computer. The personal computer may include a keyboard, a mouse, a display, and other hardware or functionality that is found on a desktop, notebook, netbook, or other personal computing devices. In examples, the voice-enabled device 102 may include an automobile, such as a car. In other examples, the voice-enabled device 102 may include a pin on a user's clothes or a phone on a user's person. In examples, the voice-enabled device 102 and may not include speaker(s) and may utilize speaker(s) of an external or peripheral device to output audio via the speaker(s) of the external/peripheral device. In this example, the voice-enabled device 102 might represent a set-top box (STB), and the device 102 may utilize speaker(s) of an another device such as a television that is connected to the STB for output of audio via the external speakers. In other examples, the voice-enabled device 102 may not include the microphone(s) 118, and instead, the voice-enabled device 102 can utilize microphone(s) of an external or peripheral device to capture audio and/or generate audio data. In this example, the voice-enabled device 102 may utilize microphone(s) of a headset that is coupled (wired or wirelessly) to the voice-enabled device 102. These types of devices are provided by way of example and are not intended to be limiting, as the techniques described in this disclosure may be used in essentially any device that has an ability to recognize speech input or other types of natural language input.

The voice-enabled device 102 of FIG. 10 may include one or more controllers/processors 112, that may include a central processing unit (CPU) for processing data and computer-readable instructions, and memory 116 for storing data and instructions of the device 102. The voice-enabled device 102 may also be connected to removable or external non-volatile memory and/or storage, such as a removable memory card, memory key drive, networked storage, etc., through input/output device interfaces 114.

Computer instructions for operating the voice-enabled device 102 and its various components may be executed by the device's controller(s)/processor(s) 112, using the memory 116 as temporary "working" storage at runtime. A device's computer instructions may be stored in a non-transitory manner in non-volatile memory 116, storage 1018, or an external device(s). Alternatively, some or all of the executable instructions may be embedded in hardware or firmware on the device 102 in addition to or instead of software.

The voice-enabled device 102 may include input/output device interfaces 114. A variety of components may be connected through the input/output device interfaces 114. Additionally, the voice-enabled device 102 may include an address/data bus 1020 for conveying data among components of the respective device. Each component within a device 102 may also be directly connected to other components in addition to, or instead of, being connected to other components across the bus 1020.

The device 102 may include a display, which may comprise a touch interface 1508. Any suitable display technology, such as liquid crystal display (LCD), organic light emitting diode (OLED), electrophoretic, and so on, may be utilized for the displays. Furthermore, the processor(s) 112 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 114 that connect to a variety of components. This wired or a wireless audio and/or video port may allow for input/output of audio/video to/from the device 102. The device 102 may also include an audio capture component. The audio capture component may be, for example, a microphone 118 or array of microphones, a wired headset or a wireless headset, etc. The microphone 118 may be configured to capture audio. If an array of microphones is included, approximate distance to a sound's point of origin may be determined using acoustic localization based on time and amplitude differences between sounds captured by different microphones of the array. The device 102 (using microphone 118, wakeword detection component 901, ASR component 170, etc.) may be configured to generate audio data corresponding to captured audio. The device 102 (using input/output device interfaces 114, antenna 1004, etc.) may also be configured to transmit the audio data to the remote system 108 for further processing or to process the data using internal components such as a wakeword detection component 901.

Via the antenna(s) 1004, the input/output device interface 114 may connect to one or more networks 110 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 110, the speech-processing system may be distributed across a networked environment. Accordingly, the device 102 and/or the remote system 108 may include an ASR component 170. The ASR component 170 of device 102 may be of limited or extended capabilities. The ASR component 170 may include language models stored in ASR model storage component, and an ASR component 170 that performs automatic speech recognition. If limited speech recognition is included, the ASR component 170 may be configured to identify a limited number of words, such as keywords detected by the device, whereas extended speech recognition may be configured to recognize a much larger range of words.

The device 102 and/or the remote system 108 may include a limited or extended NLU component 172. The NLU component 172 of device 102 may be of limited or extended capabilities. The NLU component 172 may comprise a name entity recognition module, an intent classification module and/or other components. The NLU component 172 may also include a stored knowledge base and/or entity library, or those storages may be separately located.

In examples, AED may also be performed by the voice-enabled device 102. In these examples, the operations may include causing the AED component 121 to be enabled or otherwise turned on, or the operations may include causing the AED component 121 to transition from a first mode to a second mode representing a higher sensitivity to audio data generated by the microphone 118. The AED component 121 may utilize the audio data generated by the microphone 118 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a human body hitting a floor in the event of a fall may have a given audio fingerprint, a person expressing pain and/or disorientation may have another audio fingerprint, glass breaking may have yet another audio fingerprint, etc. The AED component 121 may receive an indication, such as from an event-detection component of the type of predefined event that has been detected and may utilize reference audio fingerprints associated with that event type for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 121 may determine that the audio fingerprint corresponds to at least one of the reference audio fingerprints, such as to a given confidence level, and may generate confirmatory data indicating that the audio fingerprint corresponds to the at least one reference audio fingerprint. The confirmatory data may be sent to a fusion component of the remote system for further processing.

The device 102 and/or the remote system 108 may also include a command processor 1028 that is configured to execute commands/functions associated with a spoken command as described herein. The device 102 may include a wakeword detection component 901, which may be a separate component or may be included in an ASR component 170. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 11:
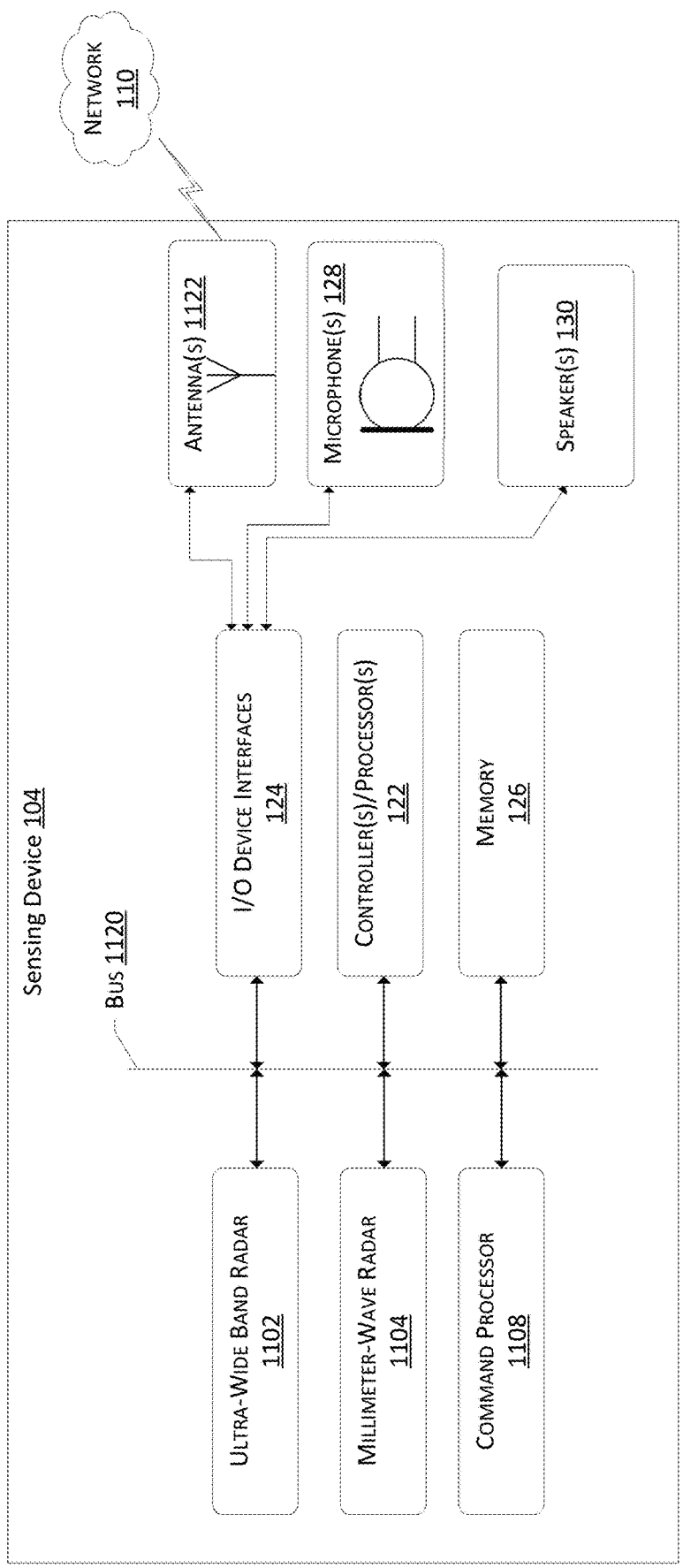
FIG. 11 illustrates a conceptual diagram of example components of a sensing device that may be utilized in association with event-detection confirmation systems.

FIG. 11 illustrates a conceptual diagram of example components of a sensing device 104 that may be utilized in association with event-detection confirmation systems. The sensing device 104 may be implemented as a standalone device. The primary, and potentially only mode, of user interaction with the device 104 may be through voice input and audible output. In some instances, the device 104 may comprise a microphone 118, a power source, and functionality for sending generated audio data via one or more antennas 1122 to another device.

In examples, the voice-enabled device 102 and may not include speaker(s) and may utilize speaker(s) of an external or peripheral device to output audio via the speaker(s) of the external/peripheral device. Additionally, sensing device 104 may include ultra-wide band radar 1102 and millimeter-wave radar 1104. For example, antennas may be configured to send and receive electromagnetic waves in radio and/or microwave domains. At least one of the antennas may be configured to send and receive electromagnetic waves having a bandwidth in the ultra-wide band range, such as a bandwidth at or around 60 GHz. At least one other of the antennas may be configured to send and receive electromagnetic waves having a bandwidth in the millimeter wave range, such as a bandwidth at or around 6 GHZ. It should be understood that while the examples used herein describe one antenna associated with the ultra-wide band range and one antenna associated with the millimeter band range, each or either of these antennas may include multiple antennas and/or antenna arrays. The antennas may transmit the electromagnetic waves into the environment in which the sensing device 104 is located and may receive the electromagnetic waves back at the sensing device 104. The distortion and/or change in the electromagnetic waves as received by the sensing device 104 may indicate motion and/or a change in position of one or more objects within the environment. The changes in motion that may be detected may include, for example, entry and/or exit of a user from the environment, location of the user relative to the sensing device 104, number of users in the environment, an angle at which a user is positioned relative to the sensing device 104, a posture of a user, movement of a user within the environment, a direction of travel of a user, a size of a user, etc.

The electromagnetic waves may be received by the antennas, which may generate corresponding audio data. The audio data may be sent to the event-detection component, which may determine whether one or more predefined events has occurred based at least in part on the audio data. For example, one or more models may be configured to receive the audio data as input and determine if one or more characteristics associated with the audio data correspond to reference audio data associated with the predefined event(s). By way of example, in the case of a user fall, the audio data may indicate that the position of the user has changed quickly from a standing to a prone or otherwise horizontal position and/or to a kneeling position. By way of additional example, the audio data may indicate that a small child, such as an infant or a baby is present in the environment and another user enters the environment. By way of additional example, the audio data may indicate a slouching motion of a user. In these examples, the event-detection component may analyze the audio data with respect to reference data indicated to correspond to these and/or other events. When the event-detection component determines that the audio data corresponds to the reference audio data, such as above a threshold confidence, the event-detection component may identify, determine, and/or generate event data indicating that the predefined event has occurred. The event data may be sent from the sensing device 104 to the remote system 108 for processing.

The sensing device 104 of FIG. 11 may include one or more controllers/processors 122, that may include a central processing unit (CPU) for processing data and computer-readable instructions, and memory 126 for storing data and instructions of the device 104. The sensing device 104 may also be connected to removable or external non-volatile memory and/or storage, such as a removable memory card, memory key drive, networked storage, etc., through input/output device interfaces 124.

Computer instructions for operating the sensing device 104 and its various components may be executed by the device's controller(s)/processor(s) 122, using the memory 126 as temporary "working" storage at runtime. A device's computer instructions may be stored in a non-transitory manner in non-volatile memory 126 or an external device(s). Alternatively, some or all of the executable instructions may be embedded in hardware or firmware on the device 104 in addition to or instead of software.

The sensing device 104 may include input/output device interfaces 124. A variety of components may be connected through the input/output device interfaces 124. Additionally, the sensing device 104 may include an address/data bus 1120 for conveying data among components of the respective device. Each component within a device 104 may also be directly connected to other components in addition to, or instead of, being connected to other components across the bus 1020.

The device 104 may also include an audio capture component. The audio capture component may be, for example, a microphone 118 or array of microphones, a wired headset or a wireless headset, etc. The microphone 128 may be configured to capture audio. If an array of microphones is included, approximate distance to a sound's point of origin may be determined using acoustic localization based on time and amplitude differences between sounds captured by different microphones of the array. The device 104 (using microphone 128, etc.) may be configured to generate audio data corresponding to captured audio. The device 104 (using input/output device interfaces 124, antenna 1122, etc.) may also be configured to transmit the audio data to the remote system 108 for further processing or to process the data using internal components.

Via the antenna(s) 1122, the input/output device interface 124 may connect to one or more networks 110 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 104 via wired connection to an external alternating current (AC) outlet, and/or via onboard power sources, such as batteries, solar panels, etc. The device 104 and/or the remote system 108 may also include a command processor 1108 that is configured to execute commands/functions associated with a spoken command as described herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device comprising:
one or more processors; and
non-transitory computer-readable media storing instructions that, when executed by the one or more processors, cause the one or more processors to perform operations comprising:
receiving sensor data indicating movement of the device;
determining, based at least in part on the sensor data, that the device is associated with a physical event indicative of the device falling;
outputting, based at least in part on determining that the device is associated with the physical event indicative of the device falling, a notification requesting confirmation of the physical event occurring, the notification corresponding to at least one of predefined text data or predefined audio data requesting the confirmation of the physical event occurring;
receiving, prior to establishing a communication channel between the device and an emergency service, user input comprising a response to the notification and confirming that the physical event occurred; and
performing, after receiving the user input and based at least in part on a type of the user input, an action selected from multiple actions, wherein the type of the user input indicates a modality of the input, wherein the action is selected from the multiple actions based at least in part on the type of the user input, and wherein the multiple actions include at least establishing the communication channel between the device and the emergency service.

2. The device of claim 1, wherein outputting the notification comprises causing, based at least in part on the physical event, a component of the device to vibrate.

3. The device of claim 1, wherein:
outputting the notification comprises causing, based at least in part on the physical event, display of a user interface requesting confirmation that the physical event occurred; and
the user input comprises touch input confirming that the physical event occurred.

4. The device of claim 1, wherein:
outputting the notification comprises causing, based at least in part on the physical event, output of audio requesting speech input confirming that the physical event occurred; and
the user input comprises the speech input.

5. The device of claim 1, wherein:
the user input indicates a request to establish the communication channel between the device and the emergency service; and
the action comprises establishing the communication channel between the device and the emergency service.

6. The device of claim 1, wherein:
the user input indicates a request to send an alert to one or more devices associated with a predefined user profile; and
the action comprises sending data representing the alert to the one or more devices.

7. The device of claim 1, the operations further comprising:
- determining a confidence value that the user input indicates confirmation that the physical event occurred; and
- selecting the action from the multiple actions based at least in part on the confidence value.

8. The device of claim 1, wherein:
- the device is associated with user account data;
- outputting the notification comprises causing a personal device associated with the user account data to output the notification; and
- performing the action comprises causing the action to be performed on the personal device.

9. The device of claim 1, the operations further comprising:
- determining that a predefined amount of time has lapsed from when the physical event was determined without having received the user input; and
- causing, based at least in part on the predefined amount of time lapsing, output of an audible alarm.

10. The device of claim 1, the operations further comprising:
- determining an environment associated with the physical event;
- identifying a voice interface device associated with the environment; and
- wherein outputting the notification comprises causing the voice interface device to request an audible response confirming the physical event.

11. A method, comprising:
- receiving sensor data indicating movement of a device;
- determining, based at least in part on the sensor data, that the device is associated with a physical event indicative of the device falling;
- outputting, based at least in part on determining that the device is associated with the physical event indicative of the device falling, a notification requesting confirmation of the physical event occurring, the notification corresponding to at least one of predefined text data or predefined audio data requesting the confirmation of the physical event occurring;
- receiving, prior to establishing a communication channel between the device and an emergency service, user input responsive to the notification, the user input comprising a response to the notification and confirming that the physical event occurred; and
- performing, after receiving the user input based at least in part on a type of the user input, an action selected from multiple actions, wherein the type of the user input indicates a modality of the input, wherein the action is selected from the multiple actions based at least in part on the type of the user input, and wherein the multiple actions include at least establishing the communication channel between the device and the emergency service.

12. The method of claim 11, wherein outputting the notification comprises causing, based at least in part on the physical event, a component of the device to vibrate.

13. The method of claim 11, wherein:
- outputting the notification comprises causing, based at least in part on the physical event, display of a user interface requesting confirmation that the physical event occurred; and
- the user input comprises touch input confirming that the physical event occurred.

14. The method of claim 11, wherein:
- outputting the notification comprises causing, based at least in part on the physical event, output of audio requesting speech input confirming that the physical event occurred; and
- the user input comprises the speech input.

15. The method of claim 11, wherein:
- the user input indicates a request to establish the communication channel between the device and the emergency service; and
- the action comprises establishing the communication channel between the device and the emergency service.

16. The method of claim 11, wherein:
- the user input indicates a request to send an alert to one or more devices associated with a predefined user profile; and
- the action comprises sending data representing the alert to the one or more devices.

17. The method of claim 11, further comprising:
- determining a confidence value that the user input indicates confirmation that the physical event occurred; and
- selecting the action from the multiple actions based at least in part on the confidence value.

18. The method of claim 11, wherein:
- the device is associated with user account data;
- outputting the notification comprises causing a personal device associated with the user account data to output the notification; and
- performing the action comprises causing the action to be performed on the personal device.

19. The method of claim 11, further comprising:
- determining that a predefined amount of time has lapsed from when the physical event was determined without having received the user input; and
- causing, based at least in part on the predefined amount of time lapsing, output of an audible alarm.

20. The method of claim 11, further comprising:
- determining an environment associated with the physical event;
- identifying a voice interface device associated with the environment; and
- wherein outputting the notification comprises causing the voice interface device to request an audible response confirming the physical event.

* * * * *